United States Patent
Beig et al.

(10) Patent No.: US 12,081,111 B2
(45) Date of Patent: Sep. 3, 2024

(54) ULTRA HIGH GAIN BIDIRECTIONAL DC TO DC CONVERTER

(71) Applicant: Khalifa University of Science and Technology, Abu Dhabi (AE)

(72) Inventors: Balanthi Mogru Abdul Rahiman Beig, Abu Dhabi (AE); Anish Ahmad, Abu Dhabi (AE); Jamal Alsawalhi, Abu Dhabi (AE); Khaled Ali Mohammed Ali Ai Jaafari, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 203 days.

(21) Appl. No.: 17/800,196

(22) PCT Filed: Mar. 9, 2021

(86) PCT No.: PCT/IB2021/051955
§ 371 (c)(1),
(2) Date: Aug. 16, 2022

(87) PCT Pub. No.: WO2021/181273
PCT Pub. Date: Sep. 16, 2021

(65) Prior Publication Data
US 2023/0084872 A1 Mar. 16, 2023

Related U.S. Application Data

(60) Provisional application No. 62/987,811, filed on Mar. 10, 2020.

(51) Int. Cl.
*H02M 1/00* (2007.01)
*H02M 1/14* (2006.01)
(Continued)

(52) U.S. Cl.
CPC .......... *H02M 1/0095* (2021.05); *H02M 1/14* (2013.01); *H02M 3/07* (2013.01); *H02M 3/158* (2013.01);
(Continued)

(58) Field of Classification Search
CPC ....... H02M 1/0095; H02M 3/158; H02M 3/07
See application file for complete search history.

(56) References Cited

U.S. PATENT DOCUMENTS 9,641,079 B2 * 5/2017 Schmalnauer ...... H02M 3/1582
10,199,924 B2 * 2/2019 Fu ........................... H02M 1/36
(Continued)

FOREIGN PATENT DOCUMENTS

KR 101730636 B1 5/2017
WO 2019049009 A1 3/2019

OTHER PUBLICATIONS

Application No. PCT/IB2021/051955, International Search Report and Written Opinion, Mailed On Jun. 24, 2021, 8 pages.
(Continued)

*Primary Examiner* — Jue Zhang
(74) *Attorney, Agent, or Firm* — Kilpatrick Townsend & Stockton LLP

(57) ABSTRACT

A bi-directional DC voltage converter includes a controller, controlled switches, inductors, and capacitors to accomplish DC voltage conversion with minimal input current ripple and high efficiency. The controller is operable in a boost mode in which the switches are independently controlled to convert low-voltage DC power to high-voltage DC power. The controller is operable in a buck mode in which the switches are independently controlled to convert high-voltage DC power to low-voltage DC power.

20 Claims, 22 Drawing Sheets

(51) Int. Cl.
*H02M 3/07* (2006.01)
*H02M 3/158* (2006.01)
*B60L 15/00* (2006.01)

(52) U.S. Cl.
CPC ......... *B60L 15/007* (2013.01); *B60L 2210/12* (2013.01); *B60L 2210/14* (2013.01); *H02M 3/1582* (2013.01)

(56) References Cited

U.S. PATENT DOCUMENTS

| | | | | |
|---|---|---|---|---|
| 11,784,600 | B2* | 10/2023 | Xu | H02M 3/1582 318/400.3 |
| 2013/0119966 | A1* | 5/2013 | Touzani | H02M 3/1582 323/312 |
| 2017/0264205 | A1 | 9/2017 | Chiang et al. | |
| 2018/0138816 | A1 | 5/2018 | Katrak | |
| 2019/0013683 | A1 | 1/2019 | Greening et al. | |

OTHER PUBLICATIONS

"Voltage Classes for Electric Mobility", ZVEI—German Electrical and Electronic Manufacturers' Association Centre of Excellence Electric Mobility, Dec. 2013. Available Online: https://www.zvei.org/fileadmin/user_upload/Presse_und_Medien/Publikationen/2014/april/Voltage_Classes_for_Electric_Mobility/Voltage_Classes_for_Electric_Mobility.pdf.

S. Chakraborty, H.-Nam Vu, M. Mahedi Hasan, D.-Duong Tran, M. El Baghdadi, O.Hegazy, "DC-DC Converter Topologies for Electric Vehicles, Plug-in Hybrid Electric Vehicles and Fast Charging Stations: State of the Art and Future Trends", Energies 2019, 12, 1569, pp. 1-43.

S. Hu, Z. Liang and X. He, "Ultracapacitor-Battery Hybrid Energy Storage System Based on the Asymmetric Bidirectional Z-Source Topology for EV," IEEE Transactions on Power Electronics, vol. 31, No. 11, pp. 7489-7498, Nov. 2016.

M. Veerachary and P. Shaw, "Controller Design and Analysis for Fifth-Order Boost Converter," IEEE Transactions on Industry Applications, vol. 54, No. 5, pp. 4894-4907, Sep.-Oct. 2018.

M. Lakshmi and S. Hemamalini, "Nonisolated High Gain DC-DC Converter for DC Microgrids," IEEE Transactions on Industrial Electronics, vol. 65, No. 2, pp. 1205-1212, Feb. 2018.

Y. Zhang, W. Zhang, F. Gao, S. Gao and D. Rogers, "A Switched-Capacitor Interleaved Bidirectional Converter with Wide Voltage-Gain Range for Super Capacitors in EVs," IEEE Transactions on Power Electronics, vol. 35, No. 2; Feb. 2020; pp. 1536-1547.

C. Lai, Y. Cheng, M. Hsieh and Y. Lin, "Development of a Bidirectional DC/DC Converter with Dual-Battery Energy Storage for Hybrid Electric Vehicle System," IEEE Transactions on Vehicular Technology, vol. 67, No. 2, pp. 1036-1052, Feb. 2018.

R. H. Ashique and Z. Salam, "A high-gain, high-efficiency nonisolated bidirectional DC-DC converter with sustained ZVS Operation," IEEE Transactions on Industrial Electronics, vol. 65, No. 10, pp. 7829-7840, Oct. 2018.

J. C. Rosas-Caro, F. Mancilla-David, J. C. Mayo-Maldonado, J. M. Gonzalez-Lopez, H. L. Torres-Espinosa and J. E. Valdez-Resendiz, "A Transformer-less High-Gain Boost Converter With Input Current Ripple Cancelation at a Selectable Duty Cycle," IEEE Transactions on Industrial Electronics, vol. 60, No. 10, pp. 4492-4499, Oct. 2013.

A. Ahmad, R. K. Singh and R. Mahanty, "Bidirectional quadratic converter for wide voltage conversion ratio," 2016 IEEE International Conference on Power Electronics, Drives and Energy Systems (PEDES), Trivandrum, 2016, pp. 1-5.

Yun Zhang, Qiangqiang Liu, Yongping Gao, Jing Li, Mark Sumner, "Hybrid Switched-Capacitor/Switched-Quasi-Z-Source Bidirectional DC-DC Converter with a Wide Voltage Gain Range for Hybrid Energy Sources EVs", IEEE Transactions on Industrial Electronics, vol. 66, No. 4, pp. 2680-2690, 2019.

Y. Zhang, Q. Liu, J. Li and M. Sumner, "A Common Ground Switched-Quasi-Z-Source Bidirectional DC-DC Converter with Wide-Voltage-Gain Range for EVs With Hybrid Energy Sources," IEEE Transactions on Industrial Electronics, vol. 65, No. 6, pp. 5188-5200, Jun. 2018.

L. Yang, T. Liang and J. Chen, "Transformerless DC-DC Converters With High Step-Up Voltage Gain," IEEE Transactions on Industrial Electronics, vol. 56, No. 8, pp. 3144-3152, Aug. 2009.

Y. Gu, Y. Chen, B. Zhang, D. Qiu and F. Xie, "High Step-Up DC-DC Converter With Active Switched LC-Network for Photovoltaic Systems," IEEE Transactions on Energy Conversion, vol. 34, No. 1, pp. 321-329, Mar. 2019.

M. A. Salvador, T. B. Lazzarin and R. F. Coelho, "High Step-Up DC-DC Converter With Active Switched-Inductor and Passive Switched-Capacitor Networks," IEEE Transactions on Industrial Electronics, vol. 65, No. 7, pp. 5644-5654, Jul. 2018.

\* cited by examiner

ULTRA HIGH GAIN BIDIRECTIONAL DC TO DC CONVERTER

CROSS-REFERENCE TO RELATED APPLICATIONS

This application claims priority to U.S. Provisional Application 62/987,811, filed on Mar. 10, 2020, the entire contents of which is incorporated herein in its entirety.

BACKGROUND

High voltage gain direct current (DC) to DC converters are employed in many electrical systems, including but not limited to: (i) integration of photovoltaic (PV) power sources with an electrical power grid, (ii) PV or battery powered alternating current (AC) sources also known as uninterrupted power supplies, (iii) battery powered electric vehicles (EV), (iv) fuel cell powered electric vehicles, and (iv) hybrid electric vehicles (HEV).

In many of the above applications, a high voltage (Voltage>200 V DC) is preferred for the common DC bus, as higher voltages result in more power transfer at higher efficiency in a compact size. The output voltage level of input energy sources for the above applications is typically low (usually 24 V to 48 V). The low voltage power supplied by the input energy sources is typically converted to a high voltage power (e.g. 110 V to 400 V). For example, a low input voltage level (say 12 V or 24 V DC) is preferred in electric vehicles, hybrid electric vehicles and fuel cell powered vehicles. A low input voltage level often results in the use of compact batteries and paralleling of batteries to get high power density. In these applications, high voltage (110 V AC or 220 V AC) motors are preferred because high voltage motors have higher efficiencies, higher power, and smaller overall size compared to low voltage motors. In heavy vehicles, motors with still higher voltage rating (e.g. 400 V AC) are preferred, requiring a DC bus voltage of the order of 800 V. Similarly, in PV systems, batteries in the range 12 V to 24 V are preferred. In PV applications, output loads match a power grid voltage, which (depending on region) may be on the order of 220 V single phase AC, 400 V line-to line (L-L) three phase AC, or comparable, which requires DC bus voltages of 400 V or 800 V. Any of the above systems may have the capacity of regeneration, i.e. allowing energy flow from an output load to an input source, in addition to normal energy flow from an input source to output load. Therefore, all such systems require high voltage gain (step up or boost) from the input source to the output load, and at the same time require a high voltage reduction ratio (step down or buck) from the output load to the input source during reverse energy flow or regeneration.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced in other configurations, or without the specific details. Furthermore, well-known features may be omitted or simplified in order not to obscure the embodiment being described.

Power ratings and battery voltages for EV/HEVs vary depending on the application. For example, power ratings for EV/HEVs generally vary from 300 W to 400 kW. At a lower end of the spectrum, the power rating for an electric scooter rating is typically a fraction of a kilowatt. The power ratings for cars are typically in a range from 3 kW to 110 kW. The power ratings for trucks are typically in a range from 100 kW to 390 kW. The voltage ratings for EV/HEVs typically vary depending upon the drive system employed. Battery voltages for EV/HEVs is typically in a range from of about 24 V to 96 V where lower voltage is preferred.

Figure 1:
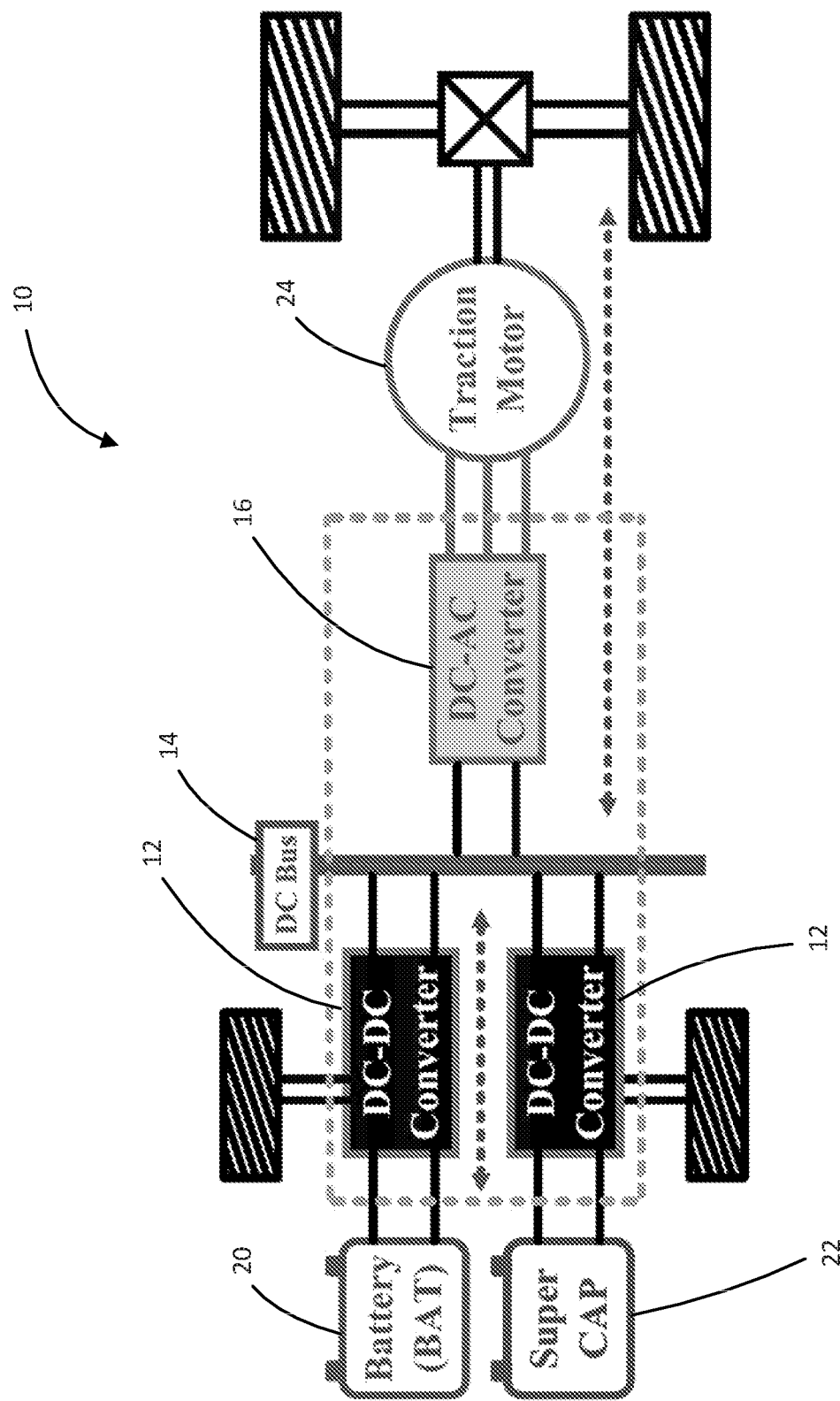
FIG. 1 is a simplified functional block diagram of an example electric vehicle drive system.

FIG. 1 is a simplified functional block diagram of an electric vehicle 10 that includes DC-DC converters 12, a DC bus 14, a DC-AC converter 16, a drive system 18, a battery 20, and a super capacitor 22. The DC-DC converters 12 are configured as described herein. The drive system 18 includes an AC traction motor 24. In the illustrated embodiment, the drive system 18 is a front-wheel drive system. The drive system 18, however, can be any suitable type of drive system such as four-wheel drive, two-wheel drive, rear-wheel drive, all-wheel drive (in the wheel and near the wheel) or any other drive train used in battery-operated electric vehicles and hybrid electric vehicles.

Figure 2:
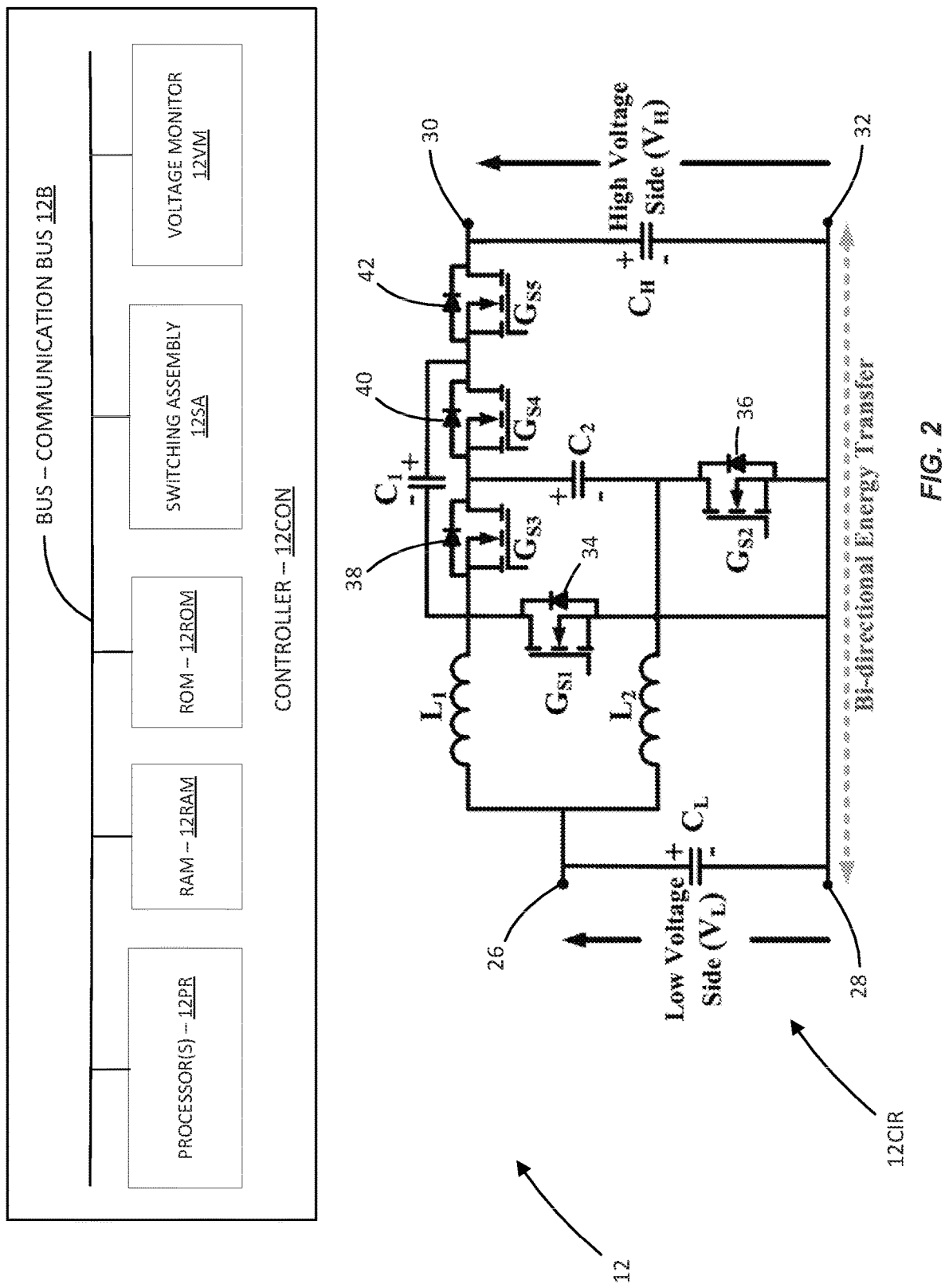
FIG. 2 shows a circuit diagram of a DC/DC converter, in accordance with various embodiments.

FIG. 2 shows a schematic diagram of a bidirectional DC-DC converter 12, according to various embodiments. The DC to DC converter 12 has bidirectional energy flow capacity. In a forward power flow mode (i.e., energy transfer from input source to output load) the DC-DC converter 12 acts as STEP UP or BOOST converter. In many embodiments, the DC-DC converter 12 is configured to produce a voltage ratio gain greater than 5.8, which is much higher that what can be achieved by many existing DC to DC converters. In a reverse power flow mode (i.e. energy transfer from output to input), the DC-DC converter 12 acts as STEP DOWN or BUCK converter with high buck (or voltage reduction) ratio of Gain <1/5.8. In many embodiments, the DC-DC converter 12 is configured to produce a step down ratio that is significantly greater than what can be achieved by many existing bidirectional converters.

In addition to having bidirectional power flow capability, embodiments of the DC-DC converter 12 can have the following attractive features:

a voltage gain (ratio of output voltage to input voltage) for boost operation of at least 5.83;

for step down or buck operation, an output voltage step-down gain can have a maximum value of 0.18;

a low number of passive circuit components, such as only two inductors and three capacitors;

a low number of switches, such as only five active switches if the DC-DC converter 12 is used as bidirectional converter, and can have only two switches if the DC-DC converter 12 is used as unidirectional boost converter;

the input and output terminals can share the same ground, and the main active switches can share the same common ground;

compared to many existing DC-DC converters, the DC-DC converter 12 has a low input current ripple, which is advantageous when the power source is a battery; and compared to many existing DC-DC converters, the DC-DC converter 12 has increased efficiency due to employing fewer passive elements and fewer conducting switches.

Operating Principle of the Converter

In the embodiment illustrated in FIG. 2, the DC-DC converter 12 includes an energy transfer control circuit (12CIR) and a controller (12CON). The energy transfer control circuit (12CIR) includes five switches ($S_1$, $S_2$, $S_3$, $S_4$, $S_5$), input terminals 26, 28, output terminals 30, 32, switch body diodes 34, 36, 38, 40, 42, inductors ($L_1$, $L_2$), output capacitor ($C_H$), input capacitor ($C_L$), and circuit capacitors ($C_1$, $C_2$). The controller (12CON) is configured to control the five switches ($S_1$, $S_2$, $S_3$, $S_4$, $S_5$) as described below to achieve reversible energy transfer between the input terminals 26, 28 and the output terminals 30, 32. The controller (12CON) can have any suitable configuration for controlling the five switches ($S_1$, $S_2$, $S_3$, $S_4$, $S_5$). In the illustrated embodiment, the controller (12CON) includes one or more processors (12PR), a random access memory (RAM) (12RAM), a read only memory (ROM) (12ROM), a switching assembly (12SA), a voltage monitor (12VM), and a communication bus (12BUS). The one or more processors (12PR) is communicatively coupled with each of the RAM (12RAM), the ROM (12ROM), the switching assembly (12SA), and the voltage monitor (12VM). The switching assembly (12SA) is operatively coupled with each of the five switches ($S_1$, $S_2$, $S_3$, $S_4$, $S_5$) to control switching of each of the five switches ($S_1$, $S_2$, $S_3$, $S_4$, $S_5$) under the control of the one or more processors (12PR). The voltage monitor (12VM) is operatively coupled with the input terminals 26, 28 and the output terminals 30, 32. The voltage monitor (12VM) monitors and communicates the magnitude of each of the low voltage-side voltage and the high voltage-side voltage to the processor(s) (12PR). The RAM (12RAM) stores instructions executable by the processor(s) (12PR) to cause the processor(s) (12PR) to control the five switches ($S_1$, $S_2$, $S_3$, $S_4$, $S_5$) as described below. The ROM (12RAM) stores operating system instructions executable by the processor(s) (12PR) for operation of the processor(s) (12PR). Since the DC-DC converter 12 is bidirectional, operation of the DC-DC converter 12 is explained for energy transfer in both the normal output and reverse (or regenerative) directions. The input- or low voltage-side source voltage is denoted by $v_L$ and high voltage- or load- or output-side voltage is denoted by $V_H$.

Nomenclature: Symbols and variables used herein is set forth below:

combinations of gating signals. PWM pulses of the gating signals are described herein and illustrated in FIGS. 4(a), 4(b), and 4(c).

1. Step-Up Operation Mode PWM1

Figures 4A, 4B, 4C:
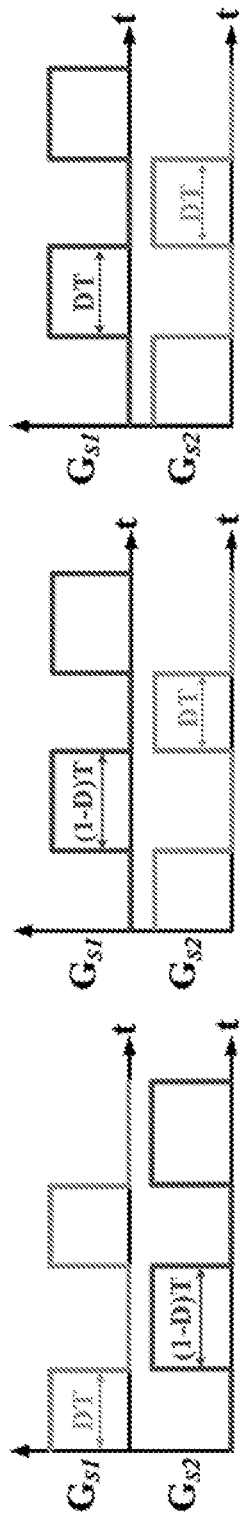
FIGS. 4a through 4c illustrate gating pulses for three types namely PWM1, PWM2 and PWM3 operation of the DC-DC converter of FIG. 2 in the step-up or boost mode of operation.

In a step-up operation mode PWM1, switch $S_1$ and switch $S_2$ are gated in a complementary mode as illustrated in FIG. 4(a). In the step-up operation mode PWM1, switch $S_1$ is in a CLOSED state for DT and switch $S_2$ is in an OPEN state for (1−D)T. In both intervals, energy is transferred from the input source to the inductors $L_1$, $L_2$, and from the inductors $L_1$, $L_2$ to the output capacitor $C_H$. For the step-up operation mode PM1 of the DC-DC converter 12, a plot 44 of steady state voltage gain $$G = \frac{V_H}{V_L}$$

| Variables | Description | Variables | Description |
|---|---|---|---|
| $v_L$ | Low side voltage (V) The voltage across capacitor $C_L$ (V). | $i_L$ | Current in low side branch |
| $v_H$ | High side voltage (V) Also equal to The voltage across capacitor $C_H$ (V). | $i_H$ | Current in high side branch |
| $v_{L1}$ | The voltage across inductor $L_1$ (V). | $i_{L1}$ | The current through inductor $L_1$ (A). |
| $v_{L2}$ | The voltage across inductor $L_2$ (V). | $i_{L2}$ | The current through inductor $L_2$ (A). |
| $v_{C1}$ | The voltage across capacitor $C_1$ (V). | $i_{C1}$ | The current through capacitor $C_1$ (A). |
| $v_{C2}$ | The voltage across capacitor $C_2$ (V). | $i_{C2}$ | The current through capacitor $C_2$ (A). |
| $v_{CH}$ | The voltage across capacitor $C_H$ (V). | $i_{CH}$ | The current through capacitor $C_H$ (A). |
| $v_{CL}$ | The voltage across capacitor $C_L$ (V). | $i_{CL}$ | The current through capacitor $C_L$ (A). |
| $v_{s1}$ | The voltage across switch $S_1$ (V). | $i_{s1}$ | The current through switch $S_1$ (A). |
| $v_{s2}$ | The voltage across switch $S_2$ (V). | $i_{s2}$ | The current through switch $S_2$ (A). |
| $v_{s3}$ | The voltage across switch $S_3$ (V). | $i_{s3}$ | The current through switch $S_3$ (A). |
| $v_{s4}$ | The voltage across switch $S_4$ (V). | $i_{s4}$ | The current through switch $S_4$ (A). |
| $v_{s5}$ | The voltage across switch $S_5$ (V). | $i_{s5}$ | The current through switch $S_5$ (A). |
| $f_{sw}$ | Switching frequency in Hz | $T = \frac{1}{f_{sw}}$ | Switching period in sec. |
| $T_{ON}$ | ON period of switch in sec. | $T_{OFF}$ | OFF period of switch in sec. |
| $D = \frac{T_{ON}}{T_{OFF}}$ | Duty cycle | | |

Note:
The lower-case letters indicate the instantaneous value a, upper case letter indicates the time independent value such as root mean square (RMS) value or average/DC value A. Step-Up or Boost Mode of Operation (Energy Transfer from Input Source to Output Load)

Figure 3:
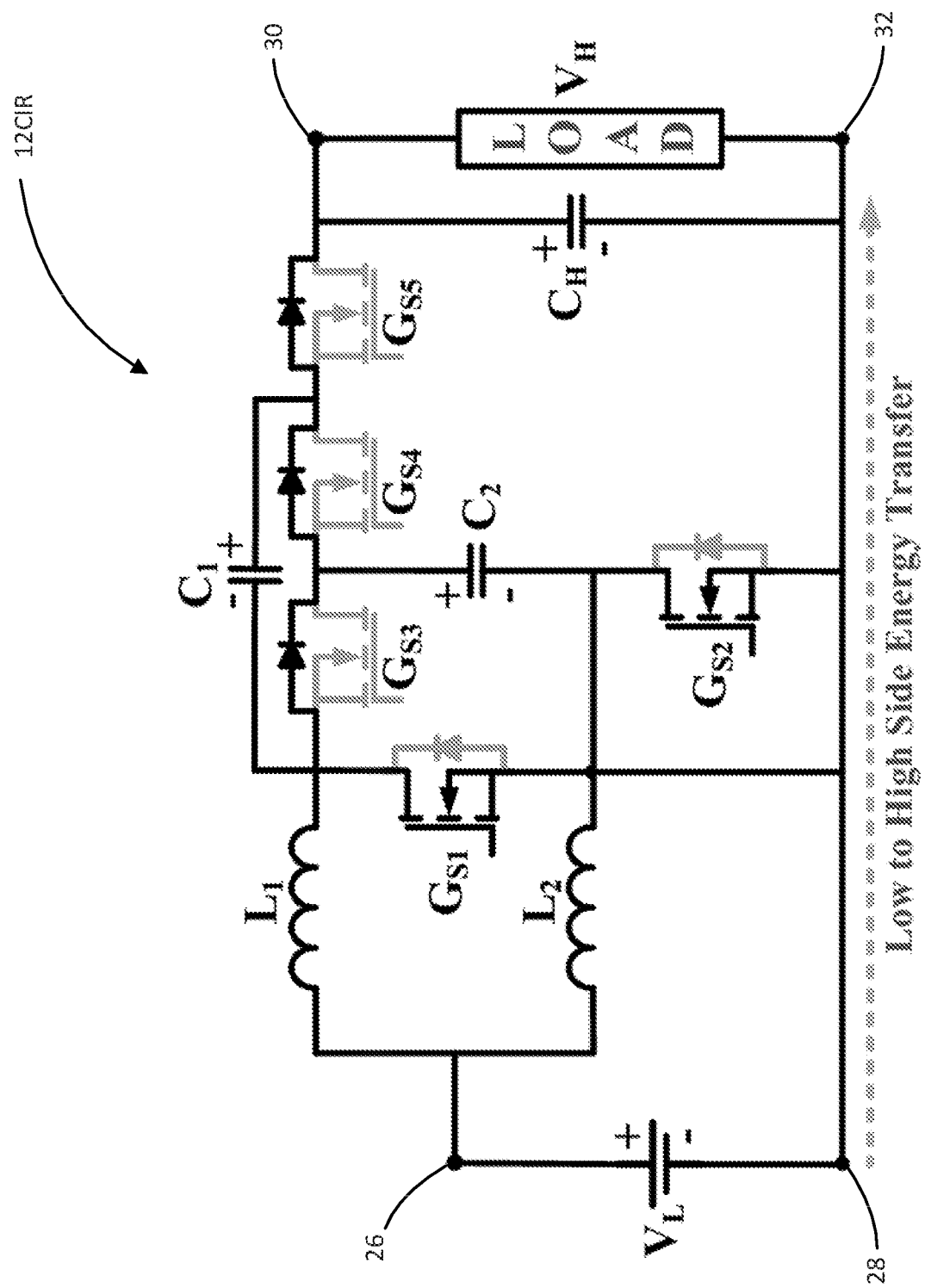
FIG. 3 illustrates the DC-DC converter of FIG. 2 in a step-up or boost mode of operation.
Figure 5:
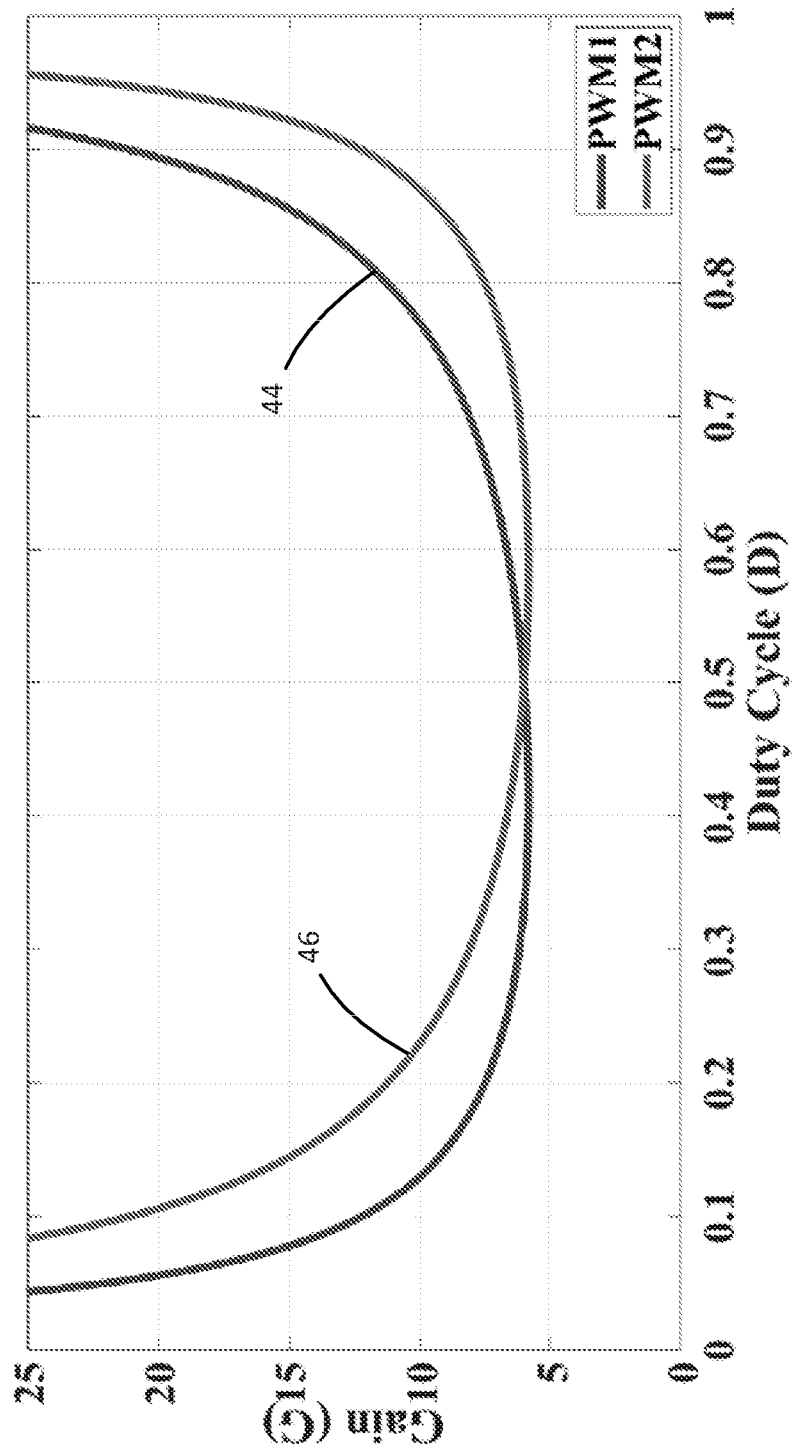
FIG. 5 is a graphical illustration showing steady state voltage gain versus duty cycle for the step-up or boost mode of operation of the circuit of FIG. 3.

The step-up mode of operation of the DC-DC converter 12 is illustrated in FIG. 3. In step up mode only switch $S_1$ and switch $S_2$ are controlled and each of the other switches $S_3$, $S_4$, $S_5$ is maintained in an OPEN state. While each of the switches $S_3$, $S_4$, $S_5$ is maintained in the OPEN state, the switch body diodes 38, 40, 42 participate in the energy transfer. Let T be the switching period and the ON time $T_{ON}$=DT, where D is the duty cycle given by $$D = \frac{T_{on}}{T}$$

and (1−D)T is OFF time. The step-up mode of operation of the DC-DC converter 12 can be achieved by three different for different values of D is shown in FIG. 5. From FIG. 5, it can be seen that the minimum voltage gain G=5.824 for the step-up operation mode PWM1 is produced when D=0.414.

2. Step-Up Operation Mode PWM2

In a step-up operation mode PWM2, switch $S_1$ and switch $S_2$ are gated in a complementary mode as illustrated in FIG. 4(b). In the step-up operation mode PWM2, switch $S_1$ is in a CLOSED state for (1−D)T and switch $S_2$ is in an OPEN state for (D)T. In both intervals, energy is transferred from the input source to the inductors L1, L2, and from the inductors L1, L2 to the output capacitor $C_H$. For the step-up operation mode PWM2 of the DC-DC converter 12, a plot 46 of steady state voltage gain $$G = \frac{V_H}{V_L}$$

for different D is shown in FIG. 5. From FIG. 5, it can be seen that the minimum voltage gain G=5.824 for the step-up operation mode PWM2 is produced when D=0.586.

3. Step-Up Operation Mode PWM3

In a step-up operation mode PWM3, switch $S_1$ and switch $S_2$ are gated in a complementary mode as illustrated in FIG. 4(c). In the step-up operation mode PWM3, switch $S_1$ and switch $S_2$ have the same duty cycle variations, arranged complementary in nature. For D>0.5, there is an interval where switch $S_1$ and switch $S_2$ both are in the CLOSED state simultaneously and for D<0.5, there is an interval where switch $S_1$ and switch $S_2$ both are in the OPEN state simultaneously. In the step-up operation mode PWM3, the DC-DC converter 12 behaves like a normal boost converter in forward energy transfer and like a normal buck converter in reverse energy transfer.

B. Step-Down Mode (Buck Mode) of Operation (Energy Transfer from Output Load Source to Input Load)

Figure 6:
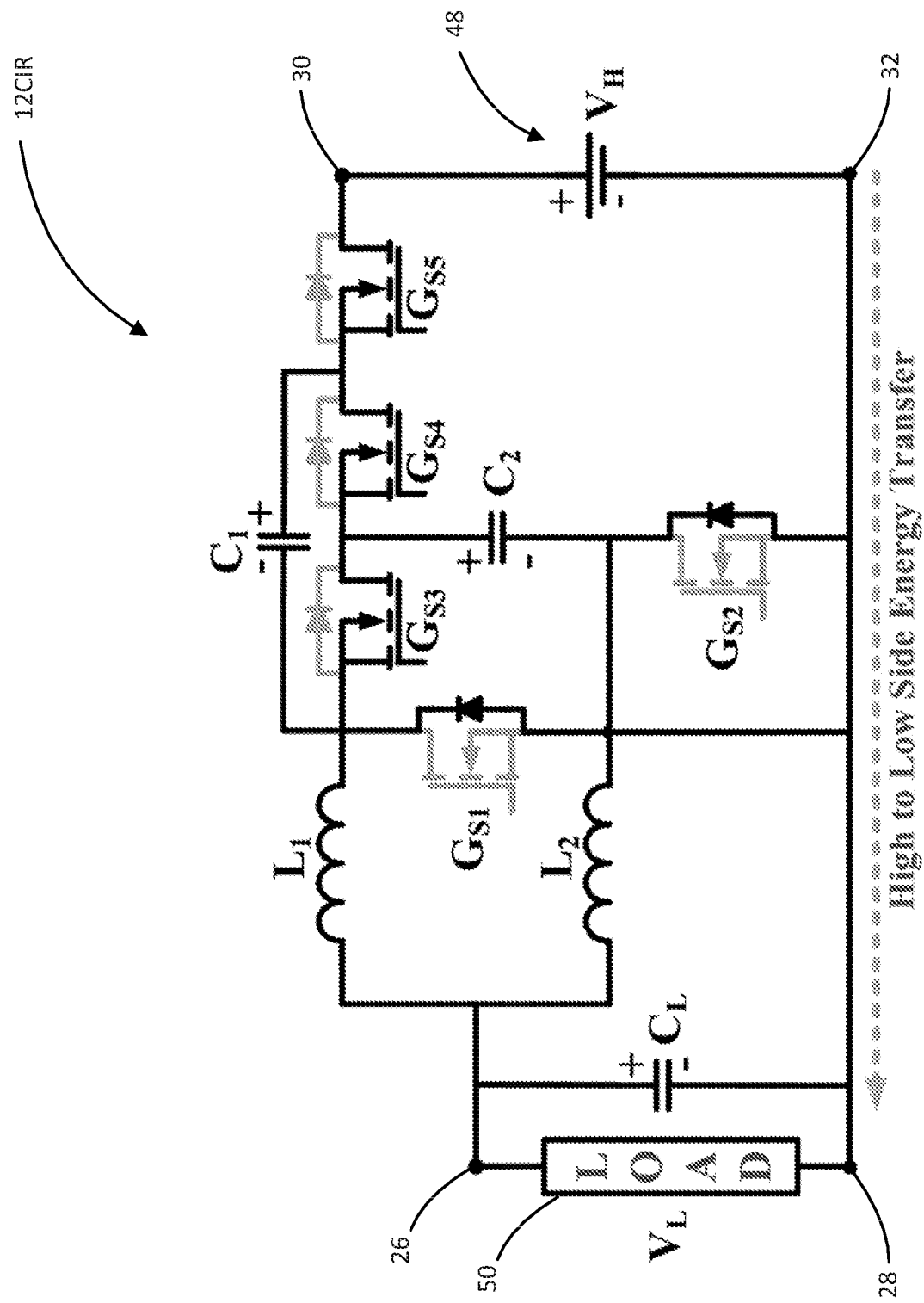
FIG. 6 illustrates the DC-DC converter of FIG. 2 in a step-down or buck mode of operation.

FIG. 6 illustrates a step-down mode (buck mode) of operation of the DC-DC converter 12. In the step-down mode of operation, the DC-DC converter 12 transfers energy from an output-side source 48 (through the output terminals 30, 32) to an input-side load 50 (through the input terminals 26, 28). In the step-down mode of operation, each of the switch $S_1$ and the switch $S_2$ is maintained in the OPEN state and the switches $S_3$, $S_4$ and $S_5$, are gated. Although each of the switch $S_1$ and the switch $S_2$ is maintained in the open state, the switch body diodes 34, 36 participate in the energy transfer depending on the voltage bias across each of the switch body diodes 34, 36. The step-down mode of operation of the DC-DC converter 12 can be achieved by either of two different combination of gating signals as explained below.

1) Step-Down Operation Mode PWM1

Figure 7A:
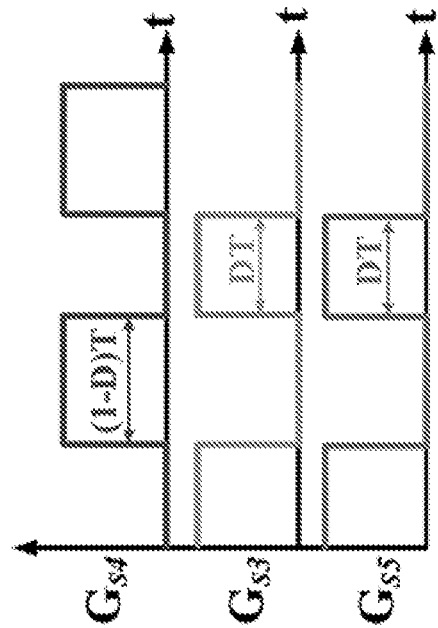
FIGS. 7a and 7b illustrate gating pulses for the two types namely PWM1 and PWM2 operation of the DC-DC converter of FIG. 2 in the step-down or buck mode of operation.
Figure 8:
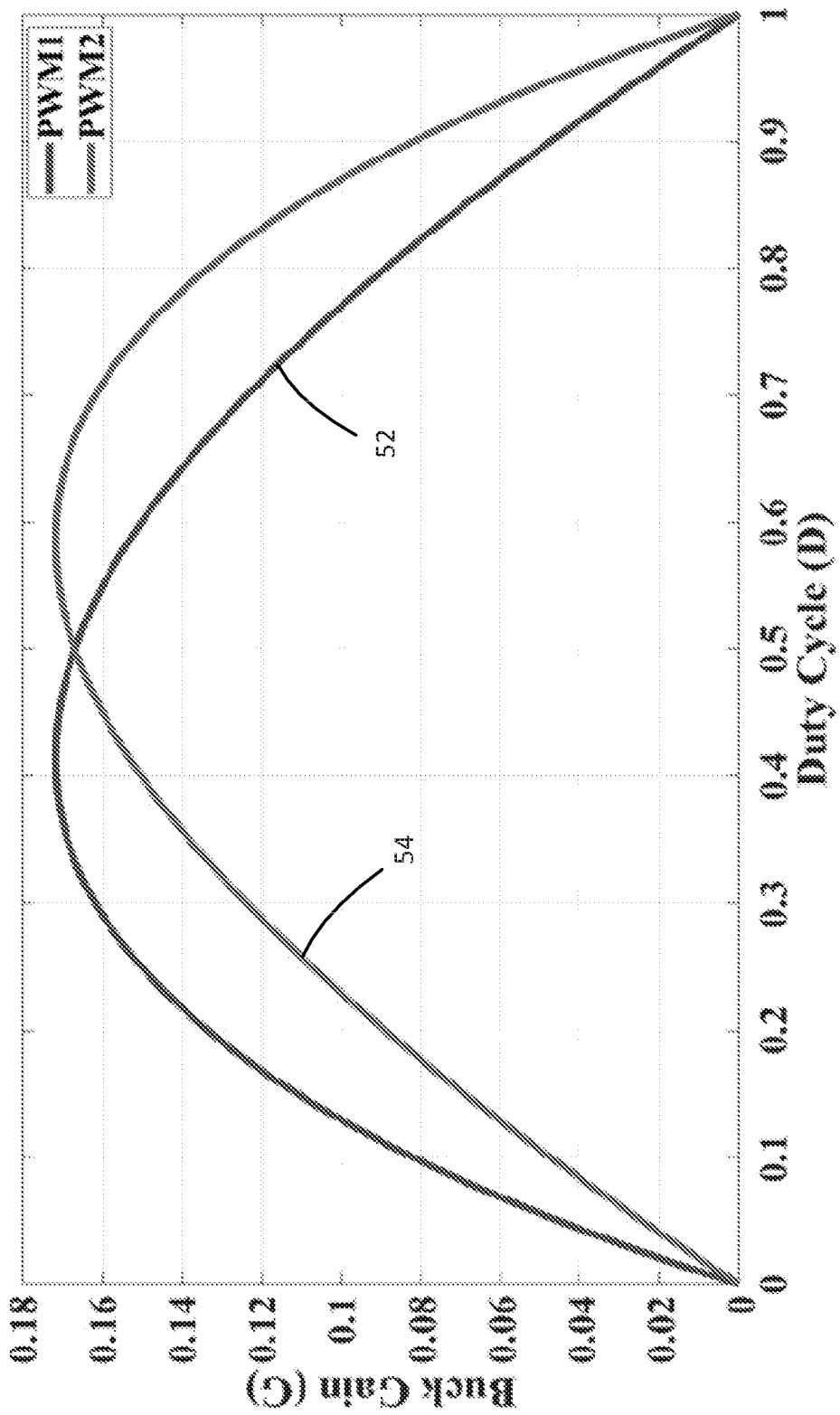
FIG. 8 is a graphical illustration showing the steady-state buck voltage gain over a duty cycle for the step-down or buck mode of operation of the circuit of FIG. 6.

In a step-down operation mode PWM1, switch $S_1$ and switch $S_2$ are gated in a complementary mode illustrated in FIG. 7(a). In the step-down operation mode PWM1, switch $S_4$ and switches $S_3$, $S_5$ are gated in a complementary mode in which $S_4$ is in the CLOSED state for DT and switches $S_3$, $S_5$ are in the CLOSED state for (1-D)T. In both the intervals, energy is transferred from the output-side source 48 (through the output terminals 30, 32) to the input-side load 50 (through the input terminals 26, 28). For the step-up operation mode PWM1 of the DC-DC converter 12, a plot 52 of steady state voltage gain $$G = \frac{V_H}{V_L}$$

for different D is shown in FIG. 8. From FIG. 8, it can be seen that the minimum voltage gain $$G = \frac{1}{5.824} = 0.172$$

for the DC-DC converter 12 in the set-down operation mode PMW 1 is produced when D=0.414.

2) Step-Down Operation Mode PWM2

Figure 7B:
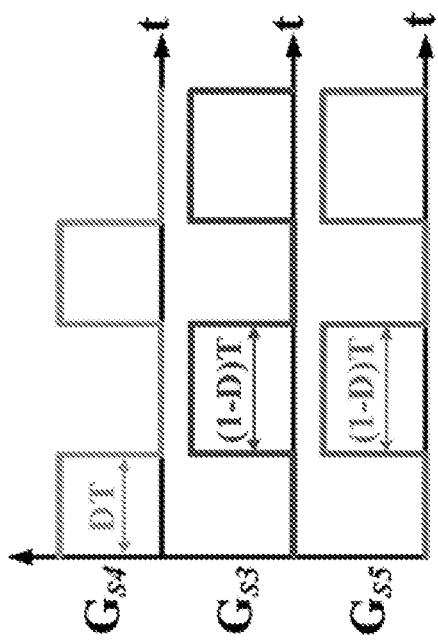

In a step-down operation mode PWM2, switch $S_1$ and switch $S_2$ are gated in a complementary mode illustrated in FIG. 7(b). In the step-down operation mode PWM1, switch $S_4$ and switches $S_3$, $S_5$ are gated in a complementary mode in which switch $S_4$ is in the CLOSED state for (1-D) T and switches $S_3$, $S_5$ are in the CLOSED state for DT. In both intervals, energy is transferred from the output-side source 48 to the input-side load 50. For the step-down operation mode PWM2, a plot 54 of steady state voltage gain $$G = \frac{V_H}{V_L}$$

for different D is shown in FIG. 8. From FIG. 8, it can be seen that the minimum voltage gain $$G = \frac{1}{5.824} = 0.172$$

for the step-down operation mode PWM2 is produced when D=0.414.

Steady State Analysis and Simulation Results

Steady state analysis and simulation was performed for the DC-DC converter 12 for each of the step-up operation mode PWM1, the step-up operation mode PWM2, the step-down operation mode PWM1, and the step-down operation mode PWM2. The circuit parameters used in the simulation are listed in Table I below.

TABLE I

Circuit Parameters For Simulation

| Parameter | Value | Parameter | Value |
|---|---|---|---|
| $V_L$ | 48 V | $R_H$, $R_L$ | 300 Ω, 7.68 Ω |
| $V_H$ | 300 V | $L_1$, $r_{L1}$ | 170 µH, 27 mΩ |
| P | 300 W | $L_2$, $r_{L2}$ | 340 µH, 50 mΩ |
| $f_{sw}$ | 100 kHz | $C_1$, $r_{C1}$ | 47 µF, 20 mΩ |
| $C_L$ | 220 µF | $C_2$, $r_{C2}$ | 47 µF, 20 mΩ |
| $r_{CL}$ | 20 mΩ | $C_H$, $r_{CH}$ | 47 µF, 20 mΩ |

Step-Up Operation Mode PWM1

In the step-up operation mode PWM1, switch $S_1$ is in the CLOSED state and switch $S_2$ is in the OPEN state for DT duration, and switch $S_2$ is in the CLOSED state and switch $S_1$ is in the OPEN state for (1-D)T duration. Switches $S_3$, $S_4$ and $S_5$ maintained in the OPEN state as shown in FIG. 5.

A. Steady Sate Analysis for 0≤t<DT Interval

Figure 9A:
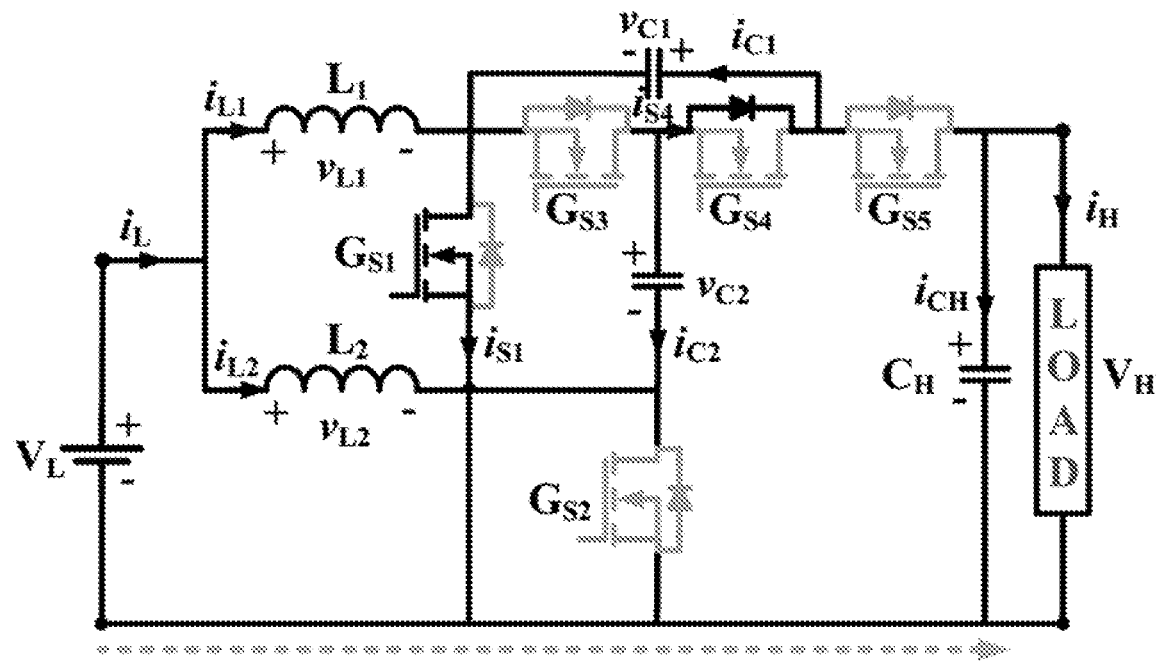
FIGS. 9a and 9b illustrate circuit status in PWM1 operation for the $0 \leq t < DT$ interval in the boost mode, with FIG. 9a showing the complete circuit and FIG. 9b showing the equivalent circuit based on the switch configuration.
Figure 9B:
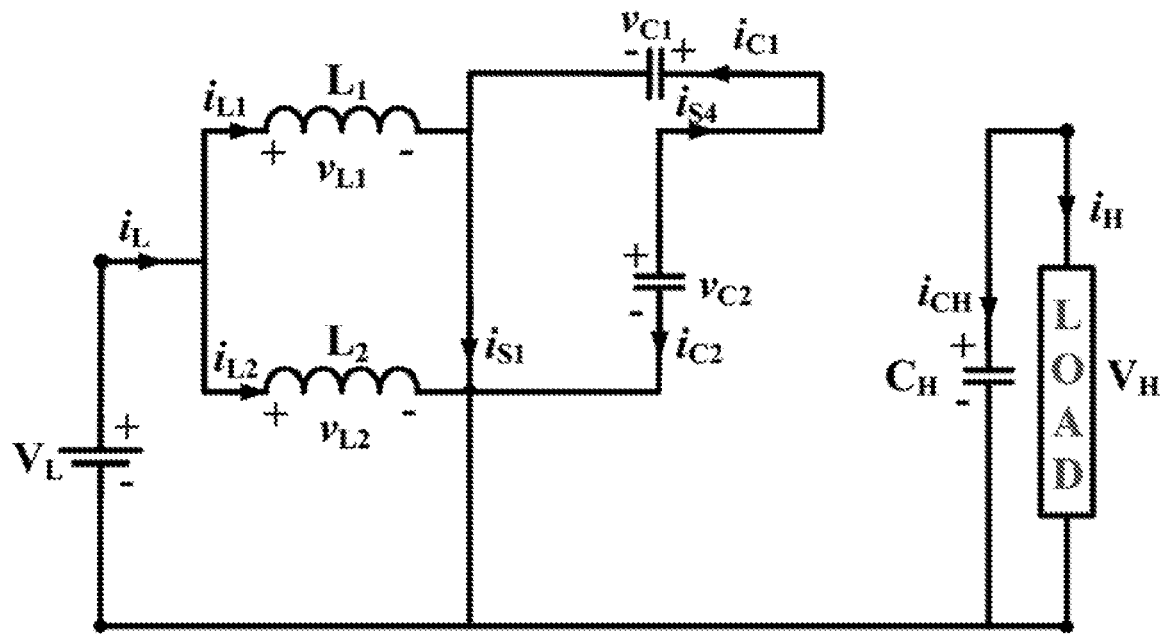

The circuit status for the DC-DC converter 12 in the step-up operation mode PWM1 in the 0≤t<DT interval is illustrated in FIG. 9(a) and an equivalent circuit for the DC-DC converter 12 in the step-up operation mode PWM1 in the 0≤t<DT interval is shown in FIG. 9(b). The inductor voltages and capacitor current expressions are written as follows:

$$v_{L1} = v_L \quad (1);$$

$$v_{L2} = v_L - v_{C1} + v_{C2} \quad (2);$$

$$i_{C1} = i_{L2} \quad (3);$$

$$i_{C2} = -i_{L2} \quad (4); \text{ and}$$

$$i_{CH} = -i_H \quad (5).$$

B. Steady Sate Analysis for DT≤t≤(1-D)T Interval

Figure 10A:
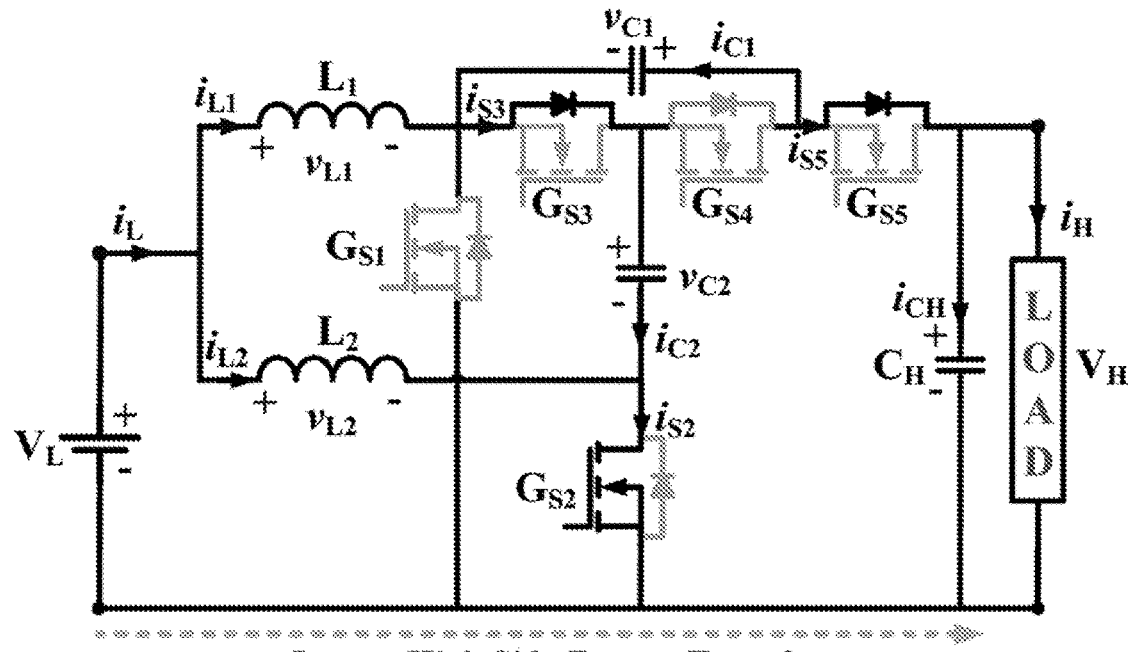
FIGS. 10a and 10b illustrate circuit status in PWM1 operation for the $DT \leq t \leq (1-D)T$ interval in the boost mode, with FIG. 10a showing the complete circuit and FIG. 10b showing the equivalent circuit based on the switch configuration.
Figure 10B:
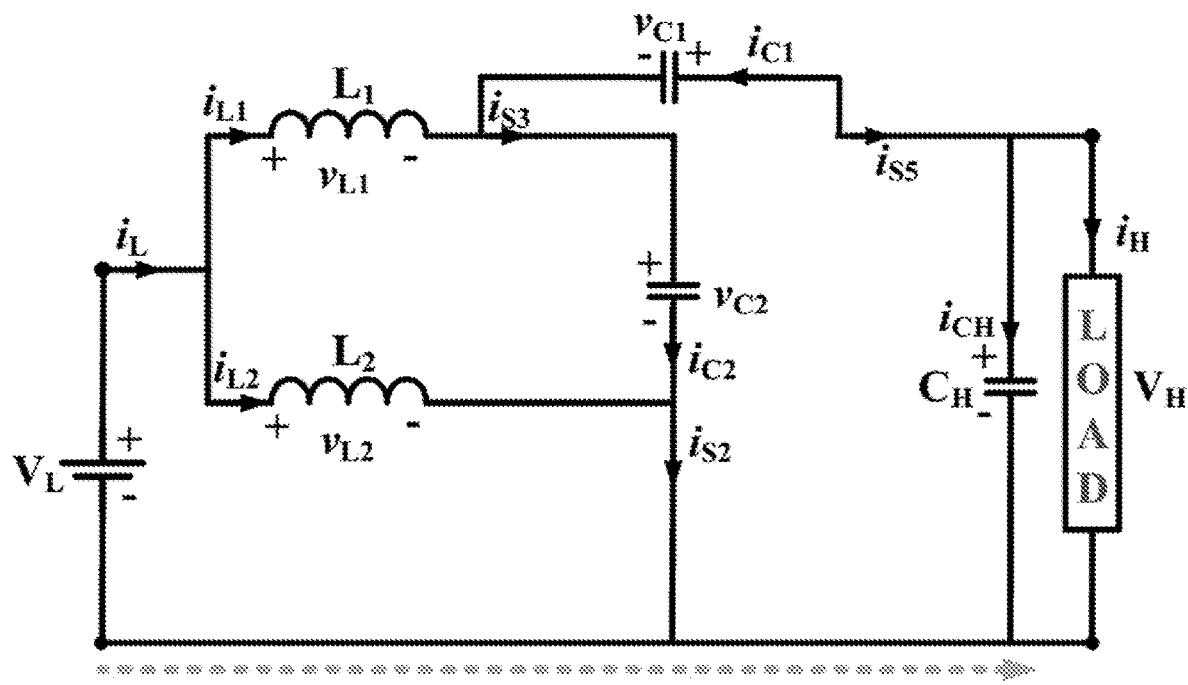
Figure 11A:
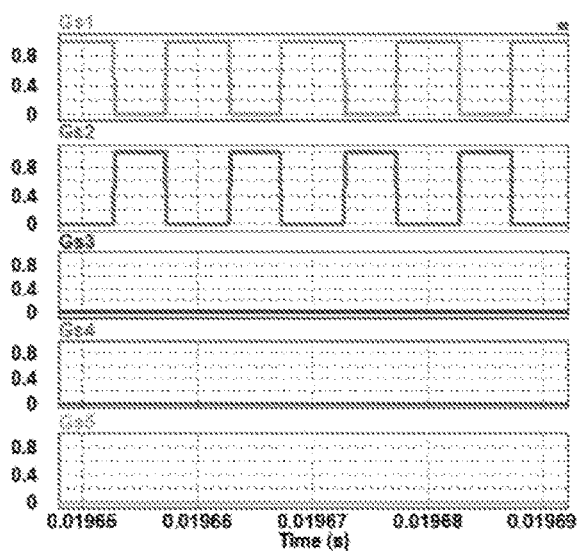
FIG. 11a shows gate pulses at each respective switch $S_1$, $S_2$, $S_3$, $S_4$ and $S_5$ in a simulation of the PWM1 operation in the boost mode.
Figure 11B:
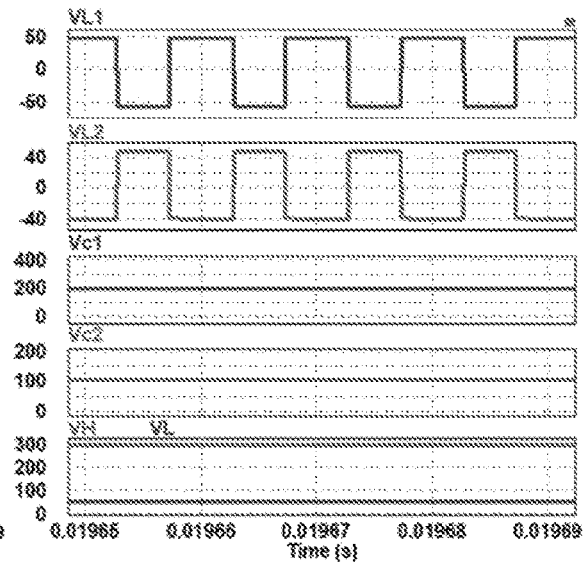
FIG. 11b shows voltage wave forms $v_{L1}$, $v_{L2}$, $v_{C1}$, $v_{C2}$, and $v_L$ and $v\_H$ in the simulation of the PWM1 operation in the boost mode.
Figure 11C:
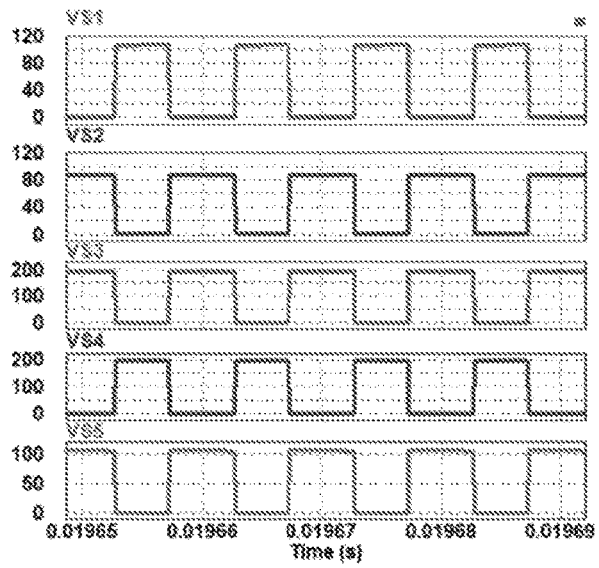
FIG. 11c shows voltage wave forms of $v_{s1}$, $v_{s2}$, $v_{s3}$, $v_{s4}$, and $v_{s5}$ in the simulation of the PWM1 operation in the boost mode.
Figure 11D:
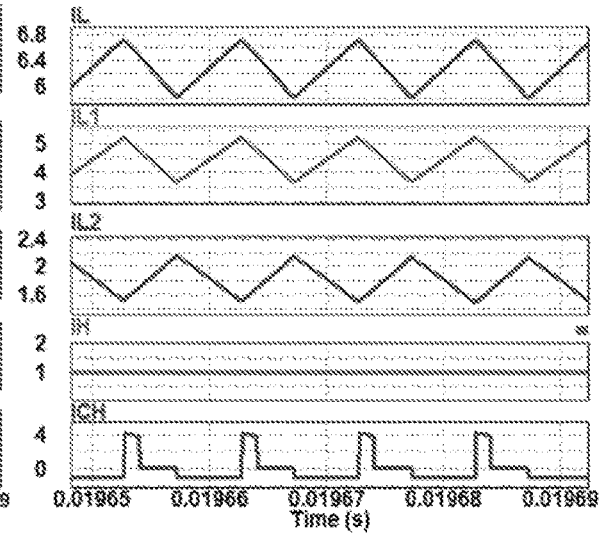
FIG. 11d shows current wave forms $i_L$, $i_{L1}$, $i_{L2}$, $i_H$ and $i_{CH}$ in the simulation of the PWM1 operation in the boost mode.
Figure 11E:
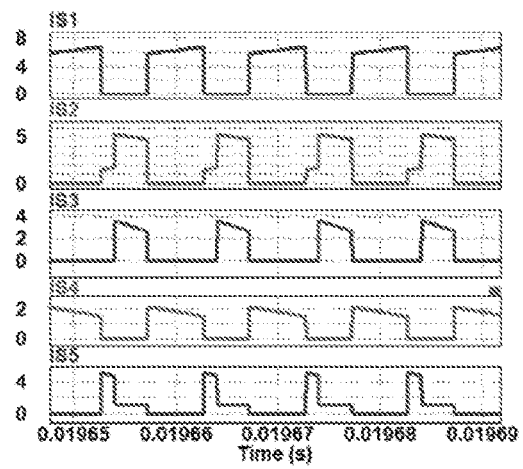
FIG. 11e shows current wave forms $i_{S1}$, $i_{S2}$, $i_{S3}$, $i_{S4}$ and $i_{S5}$ through the switches in the simulation of the PWM1 operation in the boost mode.
Figure 12A:
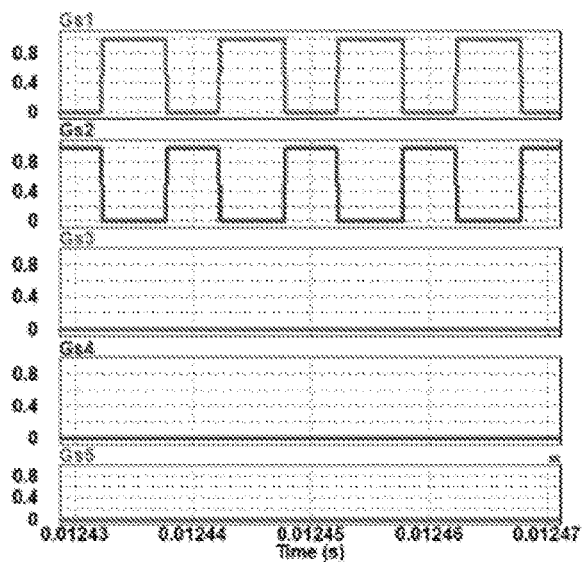
FIG. 12a shows gate pulses at each respective switch $S_1$, $S_2$, $S_3$, $S_4$ and $S_5$ in a simulation in the PWM2 operation in the boost mode.
Figure 12B:
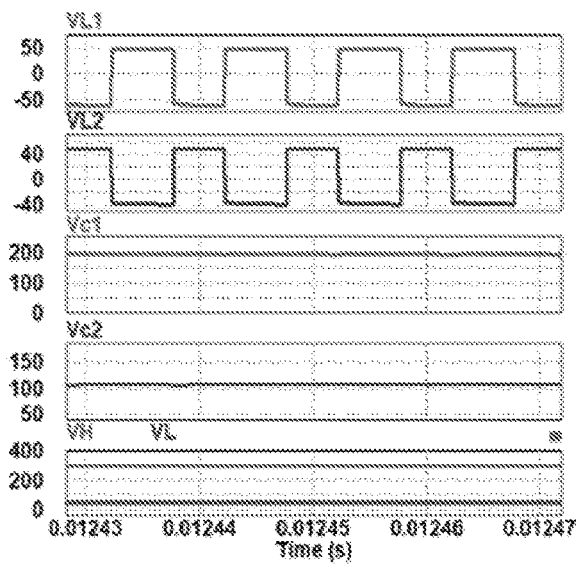
FIG. 12b shows voltage waveforms $v_{L1}$, $v_{L2}$, $v_{C1}$, $v_{C2}$, and $v_L$ and $v\_H$ in the simulation in the PWM2 operation in the boost mode.
Figure 12C:
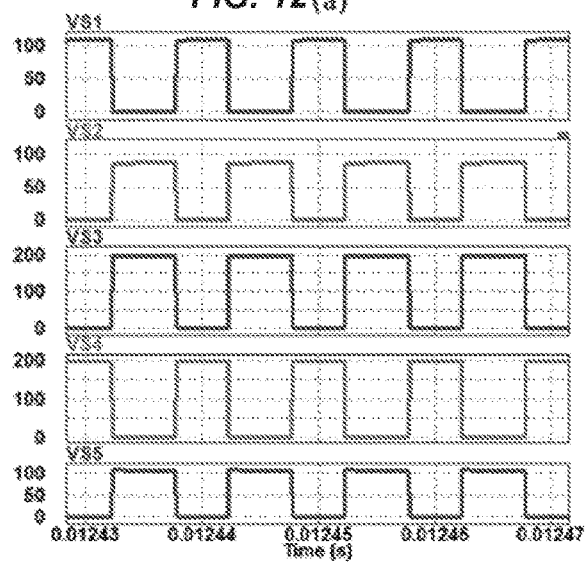
FIG. 12c shows voltage wave forms of $v_{s1}$, $v_{s2}$, $v_{s3}$, $v_{s4}$ and $v_{s5}$ in the simulation in the PWM2 operation in the boost mode.
Figure 12D:
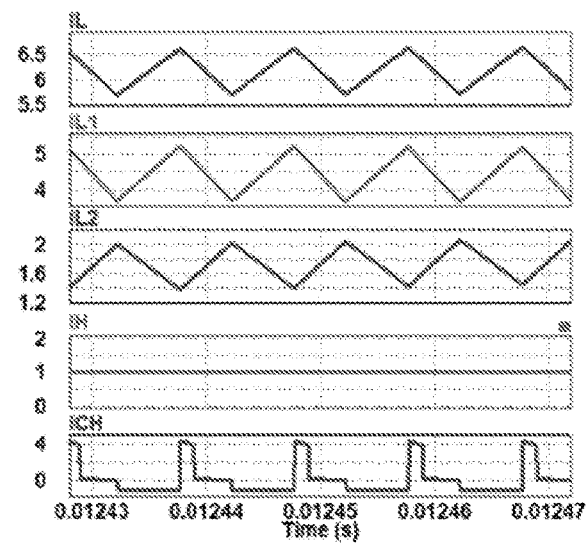
FIG. 12d shows current wave forms $i_L$, $i_{L1}$, $i_{L2}$, $i_H$ and $i_{CH}$ in the simulation in the PWM2 operation in the boost mode.
Figure 12E:
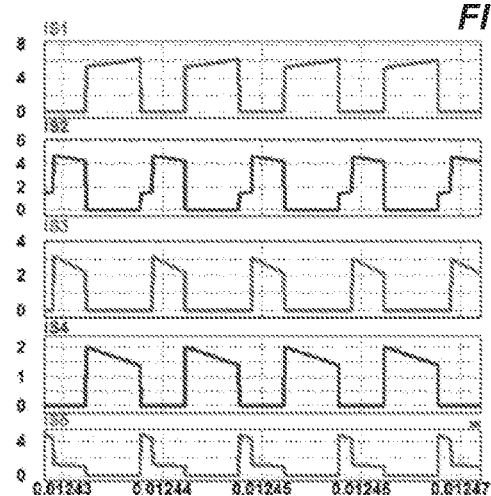
FIG. 12e shows current wave forms $i_{S1}$, $i_{S2}$, $i_{S3}$, $i_{S4}$ and $i_{S5}$ through the switches in the simulation in the PWM2 operation in the boost mode.

The circuit status for the DC-DC converter 12 in the step-up operation mode PWM1 in the DT≤t≤(1-D)T interval is illustrated in FIG. 10(a) and an equivalent circuit for the DC-DC converter 12 in the step-up operation mode PWM1 in the DT≤t≤(1−D)T interval is shown in FIG. 10(*b*). The inductor voltages and capacitor current expressions are written as follows:

$$v_{L1}=v_L-v_{C2} \quad (6)$$

$$v_{L2}=v_L \quad (7)$$

$$i_{C1}=i_{C2}-i_{L1} \quad (8)$$

$$i_{C2}=i_{L1}+i_{C1} \quad (9)$$

$$i_{CH}=i_{C1}-iH \quad (10)$$

In steady state, the capacitor average current and inductor average voltage over one switching interval should be zero. By applying volt-seconds balance principle to the $L_1$ and $L_2$ over one switching interval, we get following voltage relations:

$$V_{C1} = \frac{V_L}{D(1-D)}, \quad V_{C2} = \frac{V_L}{(1-D)},$$
$$\text{and } V_H = V_{C1} + V_{C2} = \frac{(1+D)V_L}{D(1-D)} \quad (11)$$

By implementing charge-seconds balance principle to the all the capacitors over one switching instant, we get following current relations:

$$I_{L1} = \frac{2I_H}{(1-D)}, \quad I_{L2} = \frac{I_H}{D}, \quad \text{and } I_H = \frac{D(1-D)I_L}{(1+D)} \quad (12)$$

C. Switch Voltage and Current Stress

The following gives the maximum voltage stress across each switch and maximum current through switches. This is helpful in selecting voltage and current rating of the switches.

$$\left.\begin{array}{l} V_{S1} = V_{C2} \\ V_{S2} = V_{C1} - V_{C2} \\ V_{S3} = V_{C1} \\ V_{S4} = V_{C1} \\ V_{S5} = V_{C2} \end{array}\right\} \quad (13)$$

$$\left.\begin{array}{l} I_{S1} = I_L \\ I_{S2} = \dfrac{(1+D)I_H}{D(1-D)} \\ I_{S3} = \dfrac{I_H}{(1-D)} \\ I_{S4} = \dfrac{I_H}{D} \\ I_{S5} = \dfrac{I_H}{(1-D)} \end{array}\right\} \quad (14)$$

D. Simulation Verifications

The DC-DC converter 12 is simulated for circuit condition given in Table I for D=0.55 and (1−D)=0.45. FIG. 11(*a*) shows the gate pulses $G_{s1}$, $G_{s2}$, $G_{s3}$, $G_{s4}$, and $G_{s5}$ for switches $S_1$, $S_2$, $S_3$, $S_4$ and $S_5$ respectively. Voltages across each of the inductors $L_1$, $L_2$ and capacitors $C_1$, $C_2$ as well as low voltage and high voltage are shown in FIG. 11(*b*). In FIG. 11 (*c*), the voltages across the switches are expresses as $V_{S1}$, $V_{S2}$, $V_{S3}$, $V_{S4}$ and $V_{S5}$ respectively. The input current IL, current through the $L_1$ and $L_2$ are as $I_{L1}$ and $I_{L2}$ respectively are shown in FIG. 11(*d*). Current through each of the switches are shown in FIG. 11(*e*).

The inductors $L_1$, $L_2$ are designed to limit the current ripple to less than 35% which is clear from the simulation results. One advantage of the step-up operation mode PWM1 control strategy is that the input ripple current will be less than (35/2) % because the operation of charging and discharging the inductors ($L_1$ and $L_2$) is complementary in nature. Moreover, the total current is the summation of the both inductor' currents ($I_{L1}$ and $I_{L2}$), significantly reducing the source current ripple.

The simulation results show the for 48 V input voltage ($V_L$), the output voltage ($V_H$) is 300 V when operating at 0.55 duty cycle. In one example, the DC-DC converter 12 operating at 300 W provides for an output current rating ($I_H$) obtained as 1 A, with capacitor voltages being $V_{c1}$=200 V and $V_{c2}$=100 V.

Step-Up Operation Mode PWM2

The operation of the DC-DC converter 12 in the step-up operation mode PWM2 is similar to the operation in the step-up operation mode PWM1 except that the CLOSED state and OPEN state interval of the switch $S_1$ and the switch $S_2$ are interchanged. So, FIG. 9 is also applicable for the step-up operation mode PWM2.

A. Steady Sate Analysis for 0≤t<DT Interval

The circuit status is given in FIG. 9(*a*) and equivalent circuit is shown in FIG. 9(*b*). Applying KCL and KVL in FIG. 9(*b*), the inductor voltages and capacitors current expression are written as follows, $$v_{L1}=v_L-v_{C2} \quad (15)$$

$$v_{L2}=v_L \quad (16)$$

$$i_{C1}=i_{C2}-i_{L1} \quad (17)$$

$$i_{C2}=i_{L1}+i_{C1} \quad (18)$$

$$i_{CH}=-i_{C1}-i_H \quad (19)$$

B. Steady Sate Analysis for DT≤t≤(1−D)T Interval

The circuit in interval DT≤t≤(1−D)T is shown in FIG. 10(*a*) and the equivalent circuit is shown in FIG. 10(*b*) for the step-up operation mode PWM2. The inductor voltages and capacitors current expression are written as follows, $$v_{L1}=v_L \quad (20)$$

$$v_{L2}=v_L-v_{C1}+v_{C2} \quad (21)$$

$$i_{C1}=i_{L2} \quad (22)$$

$$i_{C2}=-i_{L2} \quad (23)$$

$$i_{CH}=-i_H \quad (24)$$

In steady state, the capacitor average current and inductor average voltage over one switching interval should be zero. So, by utilizing volt-seconds balance principle to the $L_1$ and $L_2$ over one switching interval, we get following voltage relations:

$$V_{C1} = \frac{V_L}{D(1-D)}, \quad V_{C2} = \frac{V_L}{D}, \quad V_H = V_{C1} + V_{C2} = \frac{(2-D)V_L}{D(1-D)} \quad (25)$$

The currents are given by:

$$I_{L1} = \frac{2I_H}{D}, \quad I_{L2} = \frac{I_H}{(1-D)}, \quad \text{and } I_H = \frac{D(1-D)I_L}{(2-D)} \quad (26)$$

C. Switch Voltage and Current Stress

The following gives the maximum voltage stress across each switch and maximum current through switches. This is helpful in selecting voltage and current rating of the switches.

$$\left. \begin{aligned} V_{S1} &= \frac{V_L}{D} \\ V_{S2} &= V_{C1} - V_{C2} \\ V_{S3} &= \frac{V_L}{D(1-D)} \\ V_{S4} &= \frac{V_L}{D(1-D)} \\ V_{S5} &= \frac{V_L}{D} \end{aligned} \right\} \quad (27)$$

$$\left. \begin{aligned} I_{S1} &= I_L \\ I_{S2} &= \frac{(2-D)I_H}{D(1-D)} \\ I_{S3} &= \frac{I_H}{(1-D)} \\ I_{S4} &= \frac{I_H}{(1-D)} \\ I_{S5} &= \frac{I_H}{D} \end{aligned} \right\} \quad (28)$$

D. Simulation Verifications

The simulation conditions as shown in Table I are used. The nominal duty cycle is D=0.45. So, the switch $S_2$ is operated as 0.45 duty cycle and switch $S_1$ operated at 0.55 duty cycle as shown in FIG. 12. The simulation results show the for 48 V input voltage ($V_L$), the output voltage ($V_H$) is 300 V when operating at 0.45 duty cycle. For a design that takes 300 W, the output current rating ($I_H$) is obtained as 1 A, the input current ($I_H$) is 6.25 A, inductor currents $I_{L1}$=4.43 A and $I_{L2}$=1.82 A, and capacitor voltages are $V_{C1}$=194 V and $V_{C2}$=106 V. Detailed results are given in the FIG. 12.

Step-Down Operation Mode PWM1

In step-down mode of operation PWM1, the load and source terminal are interchanged and energy flow is high side to low side. In the DT interval, only switch $S_4$ is in the CLOSED state and switches $S_3$, $S_5$ are in the OPEN state. In the (1-D)T interval, switches $S_3$, $S_5$ are in the CLOSED state and switch $S_4$ is in the OPEN state. Switches $S_1$, $S_2$ are maintained in the OPEN state in the step-down mode of operation PWM1 as described herein. The circuit condition for step-down mode of operation is shown in FIG. 6.

A. Steady Sate Analysis for 0≤t<DT Interval

Figure 13A:
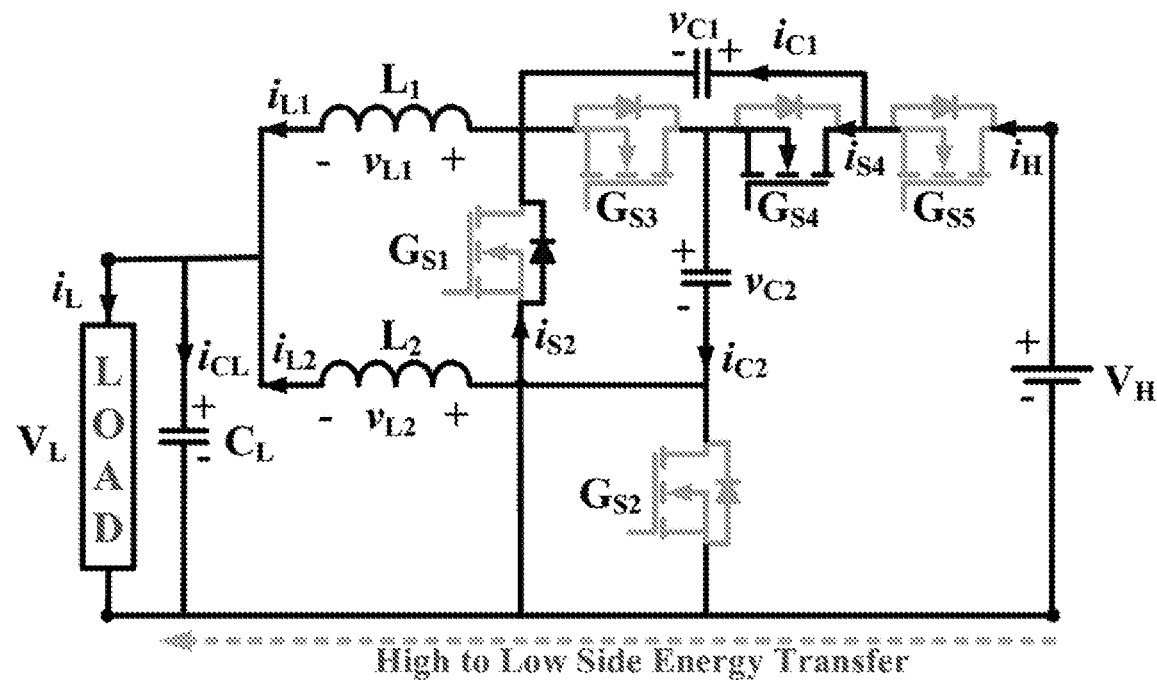
FIGS. 13a and 13b illustrate circuit status in PWM1 operation for the $0 \leq t < DT$ interval in the buck mode, with FIG. 13a showing the complete circuit and FIG. 13b showing the equivalent circuit based on the switch configuration.
Figure 13B:
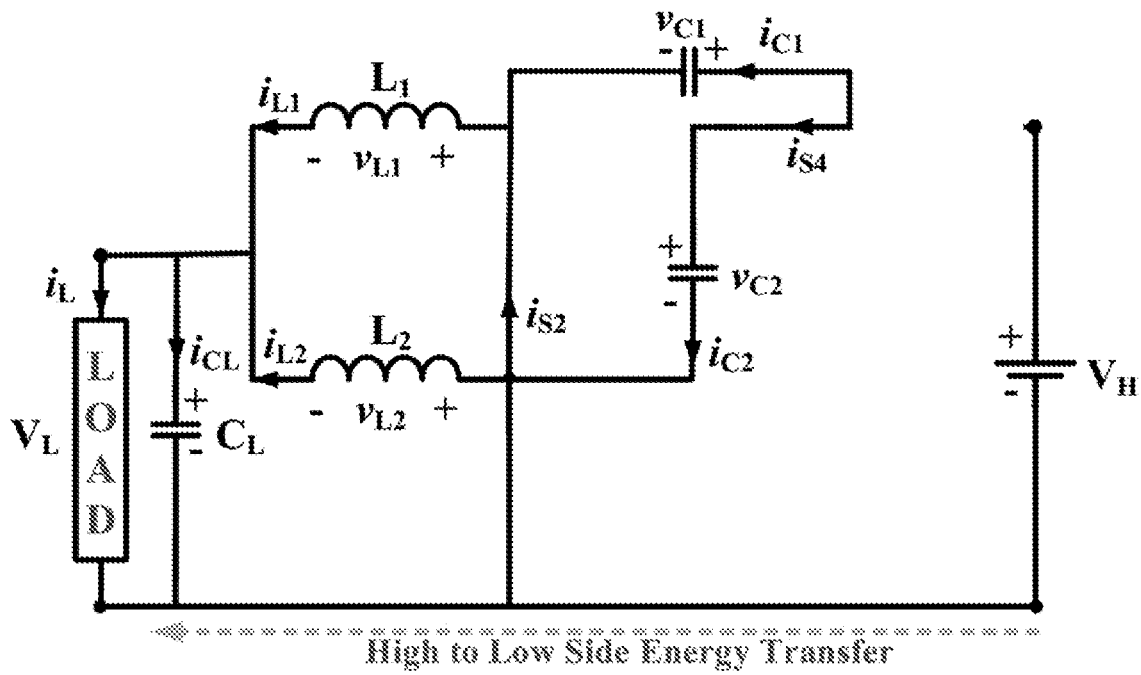

The circuit status is given in FIG. 13(a) and equivalent circuit is shown in FIG. 13(b). By applying the KVL and KCL in the equivalent circuit, the inductor voltages and capacitors current expression are written as follows:

$$v_{L1} = -v_L \quad (29);$$

$$v_{L2} = -v_L + v_{C1} - v_{C2} \quad (30);$$

$$i_{C1} = -i_{L2} \quad (31);$$

$$i_{C2} = i_{L2} \quad (32); \text{ and}$$

$$i_{CH} = i_H \quad (33).$$

B. Steady Sate Analysis for DT≤t≤(1-D)T Interval

Figure 14A:
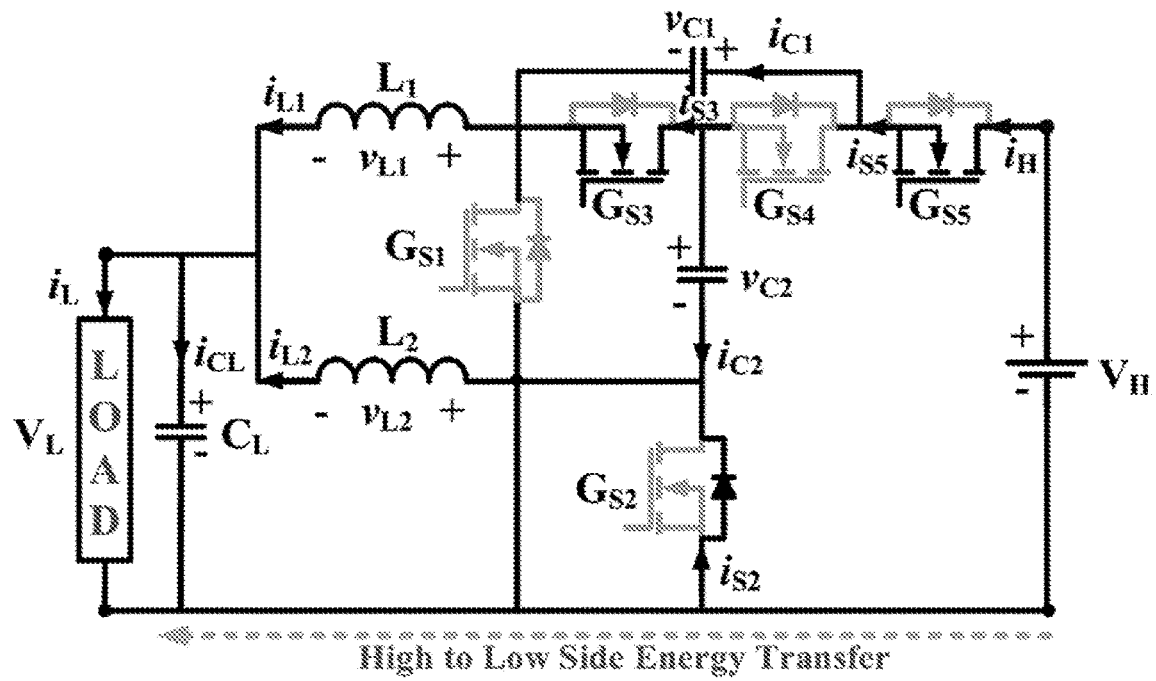
FIGS. 14a and 14b illustrate circuit status in PWM1 operation for the $DT \leq t \leq (1-D)T$ interval in the buck mode, with FIG. 14a showing the complete circuit and FIG. 14b showing the equivalent circuit based on the switch configuration.
Figure 14B:
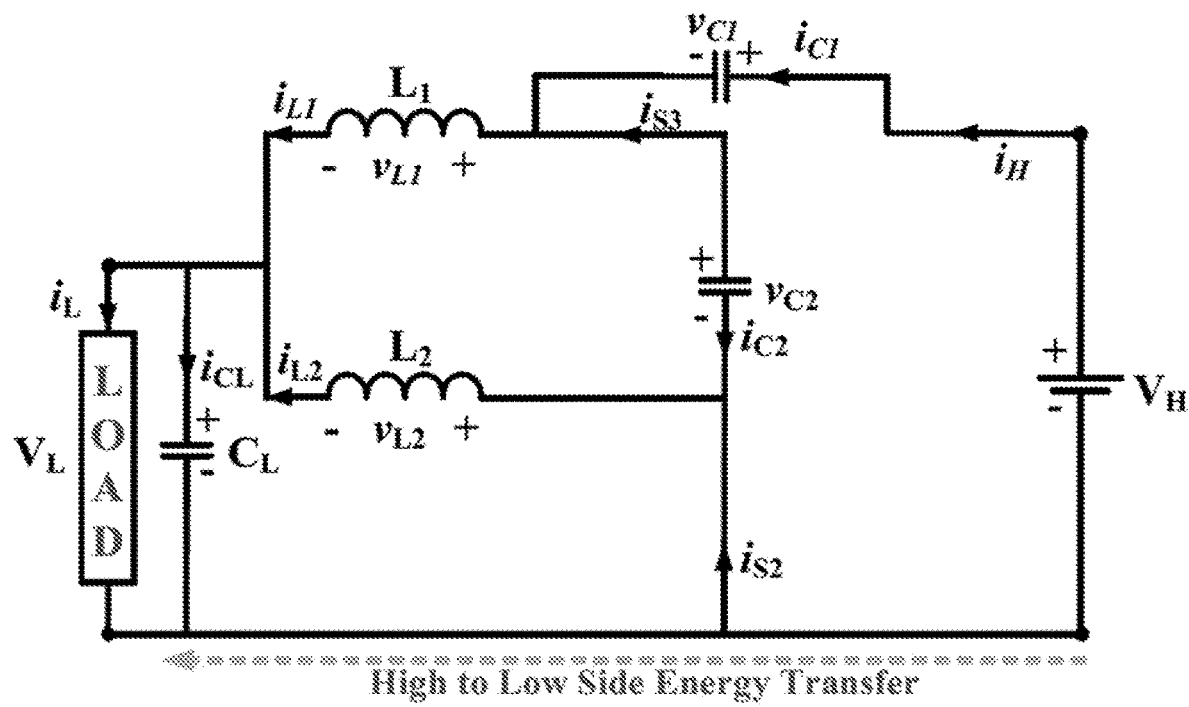
Figure 15A:
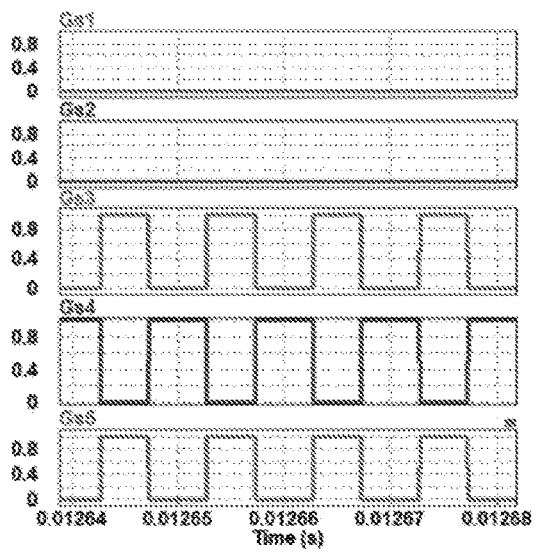
FIG. 15a shows gate pulses at each respective switch $S_1$, $S_2$, $S_3$, $S_4$ and $S_5$ in a simulation in the PWM1 operation in the buck mode.
Figure 15B:
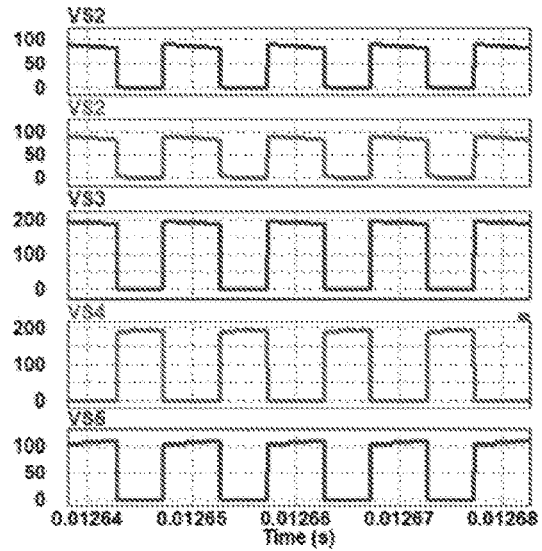
FIG. 15b shows voltage wave forms $v_{s1}$, $v_{s2}$, $v_{s3}$, $v_{s4}$, $v_{s5}$ in the simulation in the PWM1 operation in the buck mode.
Figure 15C:
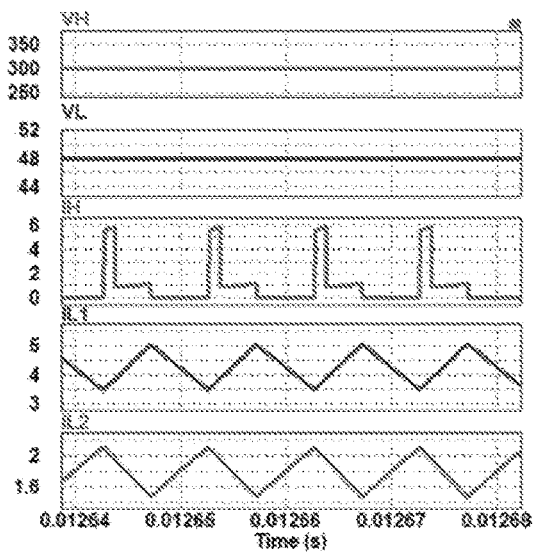
FIG. 15c shows voltage wave forms $v_H$, $i_H$, $i_{L1}$, and $i_{L2}$ in the simulation in the PWM1 operation in the buck mode.
Figure 15D:
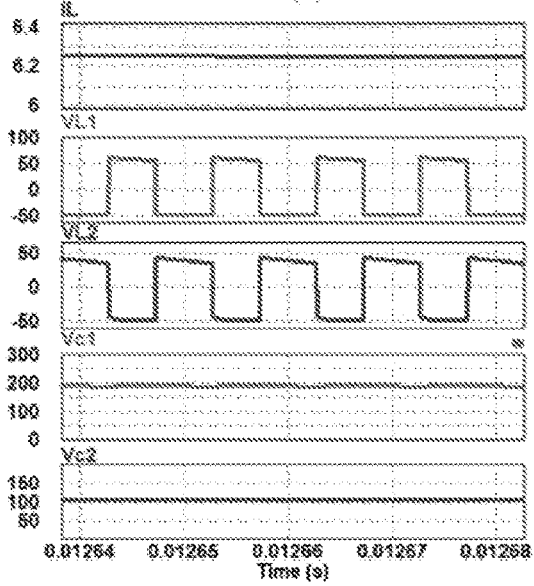
FIG. 15d shows current wave forms $i_L$, $v_{L1}$, $v_{L2}$, $v_{C1}$, and $v_{C2}$ in the simulation in the PWM1 operation in the buck mode.
Figure 15E:
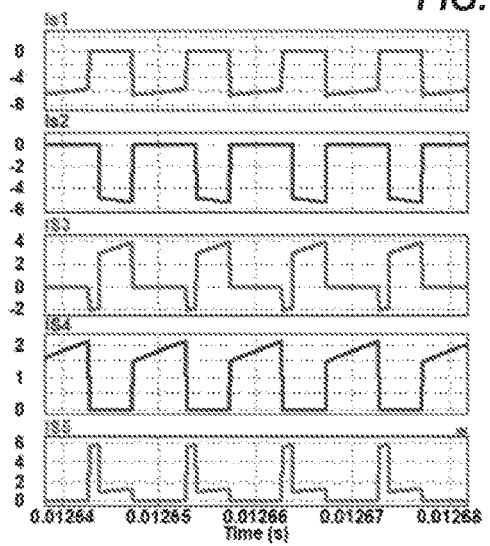
FIG. 15e shows current wave forms $i_{S1}$, $i_{S2}$, $i_{S3}$, $i_{S4}$ and $i_{S5}$ through the switches in the simulation in the PWM1 operation in the buck mode.
Figure 16A:
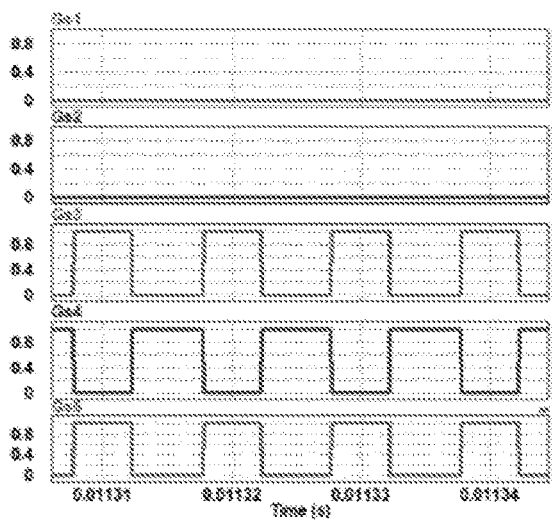
FIG. 16a shows gate pulses at each respective switch $S_1$, $S_2$, $S_3$, $S_4$ and $S_5$ in a simulation in the PWM2 operation in the buck mode.
Figure 16B:
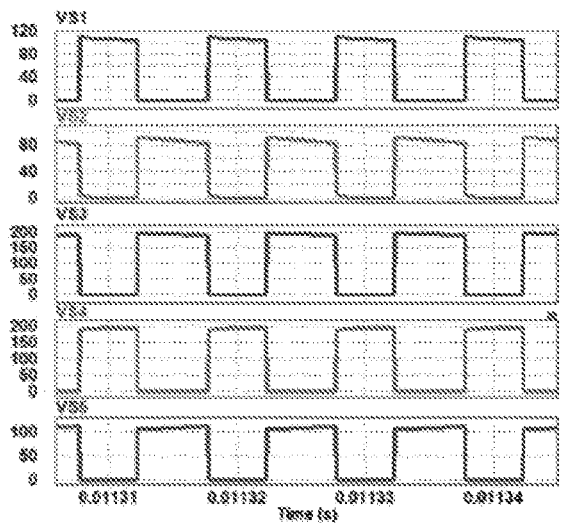
FIG. 16b shows voltage wave forms of $v_{s1}$, $v_{s2}$, $v_{s3}$, $v_{s4}$ and $v_{s5}$ in the simulation in the PWM2 operation in the buck mode.
Figure 16C:
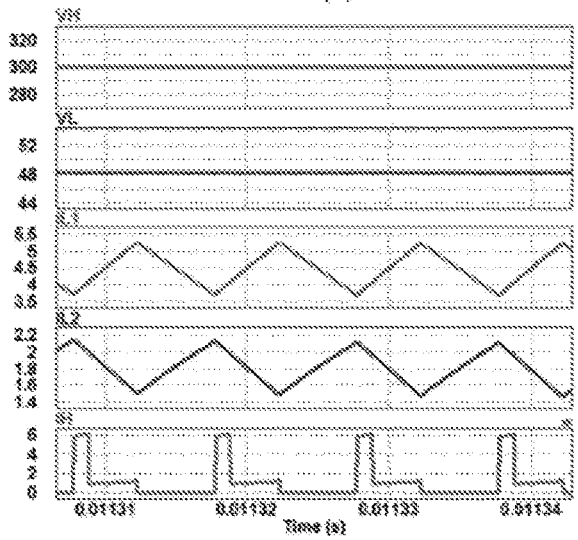
FIG. 16c shows voltage wave forms $v_H$, $v_L$, $i_{L1}$, $i_{L2}$, and $i_H$ in the simulation in the PWM2 operation in the buck mode.
Figure 16D:
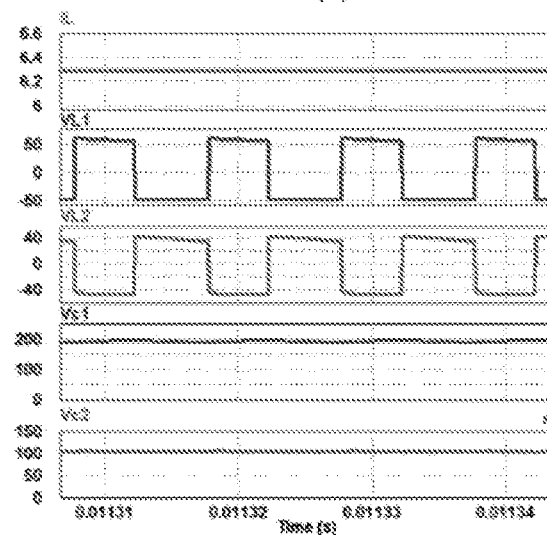
FIG. 16d shows current wave forms $i_L$, $v_{L1}$, $v_{L2}$, $v_{C1}$, and $v_{C2}$ in the simulation in the PWM2 operation in the buck mode.
Figure 16E:
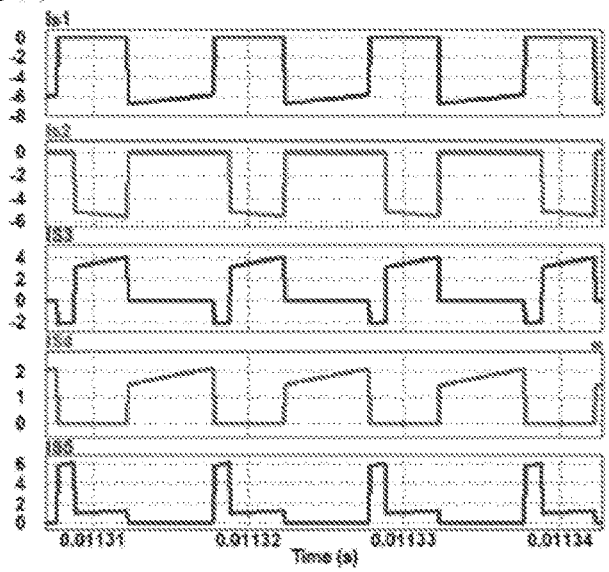
FIG. 16e shows current wave forms $i_{S1}$, $i_{S2}$, $i_{S3}$, $i_{S4}$ and $i_{S5}$ through the switches in the simulation in the PWM2 operation in the buck mode.

The circuit in interval DT≤t≤(1-D)T is showing in FIG. 14(a) and equivalent circuit is shown in FIG. 14(b) for the step-down operation mode PWM1. The inductor voltages and capacitors current expression are written as follows:

$$v_{L1} = -v_L + v_{C2} \quad (34);$$

$$v_{L2} = -v_L \quad (35);$$

$$i_{C1} = i_{C2} + i_{L1} \quad (36);$$

$$i_{C2} = -i_{L1} + i_{C1} \quad (37);$$

$$i_{CH} = -i_{C1} + i_H \quad (38); \text{ and}$$

$$i_{CL} = i_{L1} + i_{L2} - i_L \quad (39).$$

In steady state, the capacitor average current and inductor average voltage over one switching interval should be zero. By utilizing volt-seconds balance principle to the $L_1$ and $L_2$ over one switching interval, we get following voltage relations:

$$V_{C1} = \frac{V_H}{(1+D)}, \, V_{C2} = \frac{DV_H}{(1+D)}, \, V_L = \frac{D(1-D)V_H}{(1+D)} \quad (40)$$

By implementing charge-seconds balance principle to the all the capacitors over one switching instant, we get following current relations:

$$I_{L1} = \frac{(1+D)I_H}{(1-D)}, \, I_{L2} = \frac{(1+D)I_H}{D}, \text{ and } I_H = \frac{D(1+D)I_L}{(1+D)} \quad (41)$$

C. Switch Voltage and Current Stress

The maximum voltage and current rating of the switches are as follows:

$$\left. \begin{aligned} V_{S1} &= \frac{DV_H}{(1+D)} \\ V_{S2} &= V_{C1} - V_{C2} \\ V_{S3} &= \frac{V_H}{(1+D)} \\ V_{S4} &= \frac{V_H}{(1+D)} \\ V_{S5} &= \frac{V_H}{(1+D)} - V_H \end{aligned} \right\} \quad (42)$$

$$\left. \begin{aligned} I_{S1} &= I_L \\ I_{S2} &= \frac{(1+D)I_H}{D(1-D)} \\ I_{S3} &= \frac{I_H}{(1-D)} \\ I_{S4} &= \frac{(1+D)I_H}{D} \\ I_{S5} &= \frac{I_H}{(1-D)} \end{aligned} \right\} \quad (43)$$

D. Simulation Verifications

In the step-down operation mode PWM1 control strategy, the maximum voltage buck ration is G=0.172 at the duty cycle of D=0.414. The circuit parameters are given in Table I and same as that of Boost operation except the input and output terminals are interchanged.

The energy transfer is from $V_H$ to $V_L$ side. The nominal duty cycle is 0.445. The switch $S_4$ is on for 0.45 T interval and switches $S_3$ and $S_5$ are ON for (1-D)T=0.55 T duty cycle as shown in FIG. 15. No PWM signal is applied for switches $S_1$, and $S_2$. The converter is bi-directional, the ripple voltage and current ripple in capacitors and inductors is same as that of boost mode operation, which is also clear from the FIG. 15. The output current rating ($I_L$) is 6.25 A. The capacitor voltages are $V_{c1}$=194V, $V_{C2}$=106V and $V_{CH}$=$V_H$=300V. The waveforms are given in the FIG. 15.

Step-Down Operation Mode PWM2

The operation of the DC-DC converter 12 is similar to the step-down operation mode PWM2 except that the ON and OFF interval of the switch $S_4$ is interchanged with the switches $S_3$, $S_5$. So, the circuit given in FIG. 13 and FIG. 14 are also applicable for the step-down operation mode PWM2.

A. Steady Sate Analysis for 0≤t<DT Interval

The interval DT is showing in FIG. 13(b) for the step-down operation mode PWM2. The inductor voltages and capacitors current expression are written as follows:

$$v_{L1} = -v_L + v_{C2} \quad (44);$$

$$v_{L2} = -v_L \quad (45);$$

$$i_{C1} = i_{C2} + i_{L1} \quad (46);$$

$$i_{C2} = -i_{L1} + i_{C1} \quad (47); \text{ and}$$

$$i_{CH} = -i_{C1} + i_H \quad (48).$$

B. Steady Sate Analysis for DT≤t≤(1−D)T Interval

For the step-down operation mode PWM2, the DC-DC converter 12 in interval (1−D)T is shown in FIG. 14(b). The inductor voltages and capacitors current expression are written as follows:

$$v_{L1} = -v_L \quad (49);$$

$$v_{L2} = -v_L + v_{C1} - v_{C2} \quad (50);$$

$$i_{C1} = -i_{L2} \quad (51);$$

$$i_{C2} = i_{L2} \quad (52); \text{ and}$$

$$i_{CH} = i_H \quad (53).$$

In steady state, the capacitor average current and inductor average voltage over one switching interval should be zero. So, by utilizing volt-seconds balance principle to the $L_1$ and $L_2$ over one switching interval, we get following voltage relations:

$$V_{C1} = \frac{V_H}{(2-D)}, \; V_{C2} = \frac{(1-D)V_H}{(2-D)}, \; V_L = \frac{D(1-D)V_H}{(2-D)} \quad (54)$$

By implementing charge-seconds balance principle to the all the capacitors over one switching instant, we get following current relations:

$$I_{L1} = \frac{(2-D)I_H}{D}, \; I_{L2} = \frac{(2-D)I_H}{(1-D)}, \text{ and } I_L = \frac{(2-D)I_L}{D(1-D)} \quad (55)$$

C. Switch Voltage and Current Stress

The maximum voltage and current stress of the switches are as follows.

$$\left. \begin{array}{l} V_{S1} = \frac{(1-D)V_H}{(2-D)} \\ V_{S2} = V_{C1} - V_{C2} \\ V_{S3} = \frac{V_H}{(2-D)} \\ V_{S4} = \frac{V_H}{(2-D)} \\ V_{S5} = \frac{V_H}{(2-D)} - V_H \end{array} \right\} \quad (56)$$

$$\left. \begin{array}{l} I_{S1} = I_L \\ I_{S2} = \frac{(2-D)I_L}{D(1-D)} \\ I_{S3} = \frac{I_H}{D} \\ I_{S4} = \frac{(2-D)I_H}{(1-D)} \\ I_{S5} = \frac{I_H}{D} \end{array} \right\} \quad (57)$$

D. Simulation Verifications

In the step-down operation mode PWM2, the maximum buck gain is G=0.172 at the duty cycle of D=0.586. Nominal duty cycle is 0.54806. So, the switch $S_3$, $S_5$ is operated as 0.45194 duty cycle and switch $S_4$ operated at 0.54806 duty cycle as shown in FIG. 16.

The simulation results show the for 300 V input voltage $(V_H)$, the output voltage $(V_L)$ is 48V when operating at 0.54806 duty cycle. The prototype is design for 300 W so the output current rating $(I_L)$ is obtained as 6.25 A. The capacitor voltages are $V_{c1}$=194V and $V_{c2}$=106V. Other parameters are given in the FIG. 16.

Design Criteria and Selection of Components

In order to ensure the operation of the DC-DC converter 12 in continuous conduction mode (CCM), it is important to select the values of inductors and capacitors so that the current ripple in inductors and the voltage ripple in the capacitors are within the desired value. Operating the converter below this rating leads to the converter in discontinuous conduction mode (DCM). The selection of voltage and current rating of switches are based on the peak reverse voltage across the switches as well as peak current through the switches.

The capacitors and inductors are designed to limit the ripple voltage and switching frequency current ripple. Thus, for the proposed converter, the inductors and capacitors are obtained as follows:

$$L_i = \frac{DV_{Li}}{\Delta i_{Li} f_s} \quad (58)$$

$$C_i = \frac{DI_{ci}}{\Delta V_{ci} f_s} \quad (59)$$

where i=1 and 2, $\Delta i_{L1}$ and $\Delta i_{L2}$ represent ripple currents in $L_1$ and $L_2$. $\Delta V_{c1}$ and $\Delta V_{c2}$ represent ripple voltages in $C_1$ and $C_2$. $f_s$ is the switching frequency. The design procedures for all the PWM strategies are same.

The above quantities for PWM1 can be derived in terms of $V_L$ and $I_H$ as follows. As the proposed converter is bi-directional the design percentage ripple will be same for boost mode of operation as well as buck mode of operations.

$$L_1 = \frac{D(1-D)V_L}{2\Delta i_H f_s} \quad (60)$$

$$L_2 = \frac{D(1-D)V_L}{\Delta i_{LH} f_s} \quad (61)$$

$$C_1 = \frac{D(1-D)I_H}{\Delta v_{L1} f_s} \quad (62)$$

$$C_2 = \frac{(1-D)I_H}{\Delta v_L f_s} \quad (63)$$

-continued $$C_H = \frac{D^2(1-D)I_H}{\Delta v_{cL} f_s (1+D)} \quad (64)$$

where $\Delta i_H$, is the current ripple of the $I_H$ and $\Delta v_{CL}$ is the voltage ripple of the $V_L$.

For buck mode, $C_L$ is the filter capacitor across the load or output terminals and is given by $$C_L = \frac{(1-D)I_H}{\Delta v_L f_s D(1-D)} \quad (65)$$

Where $\Delta v_C$ is the voltage ripple across $C_L$.

For the converter to operate in continuous conduction mode (CCM) the critical values of the inductors are $$L_{1CR} = \frac{D(1-D)V_L}{4\Delta i_H f_s} \quad (66)$$

$$L_{2CR} = \frac{D(1-D)V_L}{2\Delta i_H f_s I} \quad (67)$$

Small Signal Analysis of the Proposed Converter

The control to output transfer function for both mode (i.e. Boost mode of operation and Buck mode of operation) are presented in this section. The dynamic performance is very similar in PWM1 and PWM2, so the small signal analysis of only PWM1 strategy is presented.

A. Small Signal Analysis for Boost Mode of Operation

The simplified equivalent circuit of proposed converter is shown in FIG. 4. Let rL1, rL2 are the parasitic DC resistances of the inductors L1 and L2. Let $r_{C1}$, $r_{C2}$, $r_{CH}$ are the ESR of the capacitances C1, C2 and CH respectively.

After applying perturbation and linearization technique to equations leads to following state space model.

$$K\hat{\dot{x}} = A\hat{x} + B\hat{v}_L + [(A_1 - A_2)X + (B_1 - B_2)V_L]\hat{d} \quad (68)$$

$$\hat{\dot{x}} = (K^{-1}A)\hat{x} + (K^{-1}B)\hat{v}_L + K^{-1}[(A_1 - A_2)X + (B_1 - B_2)V_L]\hat{d} \quad (69)$$

Let. $S_1 = (K^{-1} A)$;
$S_2 = (K^{-1} B)$;
$S_3 = K^{-1} [(A_1 - A_2)X + (B_1 - B_2)V_L]$

After simplification, $$\hat{\dot{x}} = S_1 \hat{x} + S_2 \hat{v}_L + S_3 \hat{d}$$

$A = A_1 D + A_2 (1-D)$, and $B = B_1 D + B_2 (1-D)$

From (68), the control to output transfer function for the proposed converter deduced as follows:

$$\frac{\hat{v}_H}{\hat{d}} = [0 \; 0 \; 0 \; 0 \; 1][SI - S_1]^{-1} S_3 \quad (70)$$

Therefore, the boost mode of operation in the ON interval can be written as:

$$K\dot{X} = A_1 X + B_1 V_L \quad (71)$$

$$K = \begin{bmatrix} L_1 & 0 & 0 & 0 & 0 \\ 0 & L_2 & 0 & 0 & 0 \\ 0 & 0 & C_1 & 0 & 0 \\ 0 & 0 & 0 & C_2 & 0 \\ 0 & 0 & 0 & 0 & C_H \end{bmatrix}$$

$$A_1 = \begin{bmatrix} R_{L_1} & 0 & 0 & 0 & 0 \\ 0 & L_2 & 0 & 0 & 0 \\ 0 & 0 & C_1 & 0 & 0 \\ 0 & 0 & 0 & C_2 & 0 \\ 0 & 0 & 0 & 0 & C_H \end{bmatrix} \quad (72)$$

$$B_1^T = [1 \; 1 \; 0 \; 0 \; 0] \quad (73)$$

Where $r_c = r_{C1} + r_{C2}$
In the OFF interval:

$$K\dot{X} = A_2 X + B_2 V_L$$

$$A_2 = \begin{bmatrix} -\left(r_{L1} + \frac{r_{c1} r_{c2}}{r_c}\right) & 0 & \frac{r_{c2}}{r_c} & -\frac{r_{c1}}{r_c} & -\frac{r_{c2}}{r_c} \\ 0 & -r_{L2} & 0 & 0 & 0 \\ -\frac{r_{c2}}{r_c} & 0 & -\frac{1}{r_c} & -\frac{1}{r_c} & \frac{1}{r_c} \\ \frac{r_{c1}}{r_c} & 0 & -\frac{1}{r_c} & -\frac{1}{r_c} & \frac{1}{r_c} \\ \frac{r_{c2}}{r_c} & 0 & \frac{1}{r_c} & \frac{1}{r_c} & -\left(\frac{1}{r_c} + \frac{1}{r_H}\right) \end{bmatrix} \quad (74)$$

$$B_1^T = [1 \; 1 \; 0 \; 0 \; 0] \quad (75)$$

The representation ($\sim$) denotes the small signal ac variation of the signal. The lower cases correspond to the instantaneous values, and upper cases correspond to the steady state values.

$X^T = [i_{L1} i_{L2} v_{C1} v_{C2} v_H]$

By using equation (69) and using the parameters used in the proposed converter (Table I), the control to output transfer function can be written as:

$$\frac{\hat{v}_H}{\hat{d}} = \frac{-1.9*10^5 S^4 - 7.37*10^{10} S^3 + 8.33*10^{15} S^2 - 2.34*10^{17} S + 2.42*10^{23}}{4S^5 + 2.9*10^{10} S^4 + 1.5*10^9 S^3 + 1.58*10^{14} S^2 + 3.85*10^{16} S + 4.68*10^{20}} \quad (76)$$

$$\frac{\hat{v}_H}{\hat{d}} = \frac{-1.19*10^5 S^4 - 4.97*10^{10} S^3 + 3.61*10^{15} S^2 - 6.02*10^{17} S + 8.95*10^{22}}{2.52S^5 + 1.82*10^6 S^4 + 9.5*10^8 S^3 + 9.93*10^{13} S^2 + 2.41*10^{16} S + 2.92*10^{20}}$$

B. Small Signal Analysis for Buck Mode of Operation

For the buck mode of operations of PWM1, the matrixes are written as:
In the ON interval:

$$K\dot{X} = A_1 X + B_1 V_H \quad (77)$$

$$K = \begin{bmatrix} L_1 & 0 & 0 & 0 & 0 \\ 0 & L_2 & 0 & 0 & 0 \\ 0 & 0 & C_1 & 0 & 0 \\ 0 & 0 & 0 & C_2 & 0 \\ 0 & 0 & 0 & 0 & C_H \end{bmatrix}$$

-continued $$A_1 = \begin{bmatrix} -r_{L1} & 0 & 0 & 0 & -1 \\ 0 & -(r_{L2}+r_c) & 1 & -1 & -1 \\ 0 & -1 & 0 & 0 & 0 \\ 0 & 1 & 0 & 0 & 0 \\ 1 & 1 & 0 & 0 & -\frac{1}{R_L} \end{bmatrix} \quad (78)$$

$$B_1^T = [0 \ 0 \ 0 \ 0 \ 0] \quad (79)$$

Where $r_C = r_{C1} + r_{C2}$

In the OFF interval:

$$K\dot{X} = A_2 X + B_2 V_H \quad (80)$$

$$A_2 = \begin{bmatrix} -(r_{L1}+\frac{r_{c1}r_{c2}}{r_c}) & 0 & -\frac{r_{c2}}{r_c} & \frac{r_{c1}}{r_c} & -1 \\ 0 & -r_{L2} & 0 & 0 & -1 \\ \frac{r_{c2}}{r_c} & 0 & -\frac{1}{r_c} & -\frac{1}{r_c} & 0 \\ -\frac{r_{c1}}{r_c} & 0 & -\frac{1}{r_c} & -\frac{1}{r_c} & 0 \\ 1 & 1 & 0 & 0 & -\frac{1}{r_L} \end{bmatrix}$$

$$B_2^T = [\frac{r_{c2}}{r_c} \ 0 \ \frac{1}{r_c} \ \frac{1}{r_c} \ 0] \quad (81)$$

The representation (~) denotes the small signal ac variation of the signal. The lower cases correspond to the instantaneous values, and upper cases correspond to the steady state values.

$$X^T = [i_{L1} i_{L2} v_{C1} v_{C2} v_H]$$

By using equation (70) and using the parameters used in the proposed converter (Table I), the control to output transfer function can be written as:

$$\frac{\tilde{v}_L}{\tilde{d}} = \frac{1.2*10^{10}S^2 + 8*10^{11}S + 5.76*10^{17}}{7.24S^4 + 7.12*10^3S^3 + 6.54*10^8S^2 + 3.43*10^{11}S + 1.45*10^{16}} \quad (82)$$

Non-Ideal or Practical Voltage Gain of the Proposed Converter

This section gives the effect of parasitic element such as inductors and capacitors on voltage gain performance with duty cycle.

A. Boost Mode:

The actual practical steady state gain ($G_{Practical}$) for PWM1 strategies is given by, $$G_{Practical} = \quad (83)$$

$$\frac{V_H}{V_L} = \frac{1+D}{D(1-D)} * \frac{1}{1+\frac{2}{(1-D)}*\frac{(r_c^2 - r_{c2}^2)}{r_{c2}R_H} + \frac{2D}{(1-d)^2}*\frac{r_c r_{L1}}{r_{c2}R_H}}$$

Let, $$\frac{r_c^2 - r_{c2}^2}{r_{c2}R_H} = \frac{R_x}{R_H} \text{ And } \frac{r_c r_{L1}}{r_{c2}R_H} = \frac{R_y}{R_H},$$

The above can be written as, $$G_{Practical} = \frac{V_H}{V_L} = \frac{1+D}{D(1-D)} * \frac{1}{1+\frac{2}{(1-D)}*\frac{R_x}{R_H} + \frac{2D}{(1-d)^2}*\frac{R_y}{R_H}} \quad (84)$$

The actual practical steady state gain ($G_{Practical}$) for PWM2 strategies is given by, $$G_{Practical} = \quad (85)$$

$$\frac{V_H}{V_L} = \frac{2-D}{D(1-D)} * \frac{1}{1+\frac{2}{D}*\frac{r_c}{r_{c2}R_H}*(r_c - \frac{r_{c2}^2}{r_c} - r_{L1}) + \frac{2}{D^2}*\frac{r_c r_{L1}}{r_{c2}R_H}}$$

Let, $$\frac{r_c}{r_{c2}R_H}*(r_c - \frac{r_{c2}^2}{r_c} - r_{L1}) = \frac{R_x}{R_H} \text{ And } \frac{r_c r_{L1}}{r_{c2}R_H} = \frac{R_y}{R_H},$$

The above can be written as, $$G_{Practical} = \frac{V_H}{V_L} = \frac{2-D}{D(1-D)} * \frac{1}{1+\frac{2}{D}*\frac{R_x}{R_H} + \frac{2}{D^2}*\frac{R_y}{R_H}} \quad (86)$$

Figure 17:
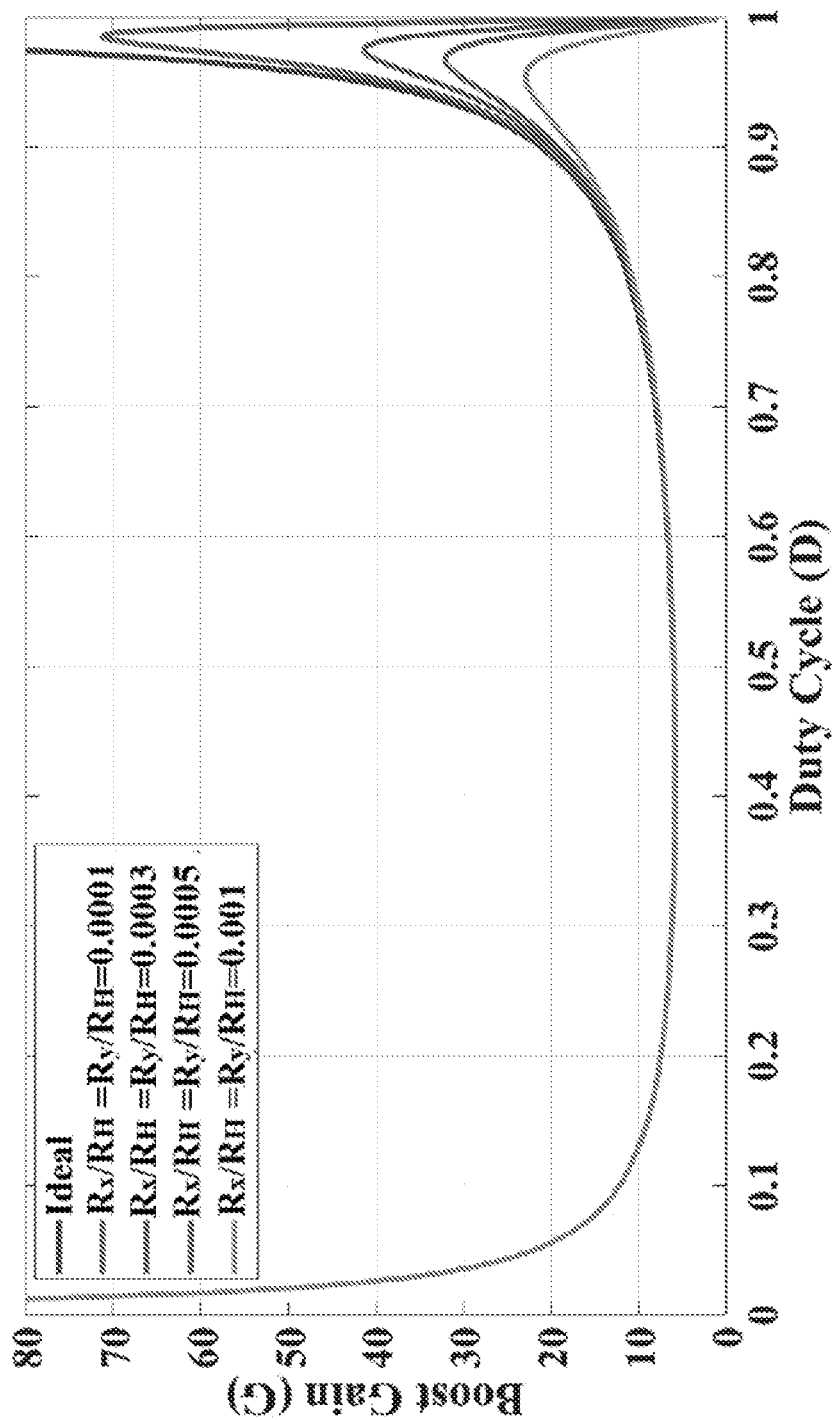
FIG. 17 shows the actual or non-ideal gain of the DC-DC converter of FIG. 2 in configuration PWM1 in boost mode.
Figure 18:
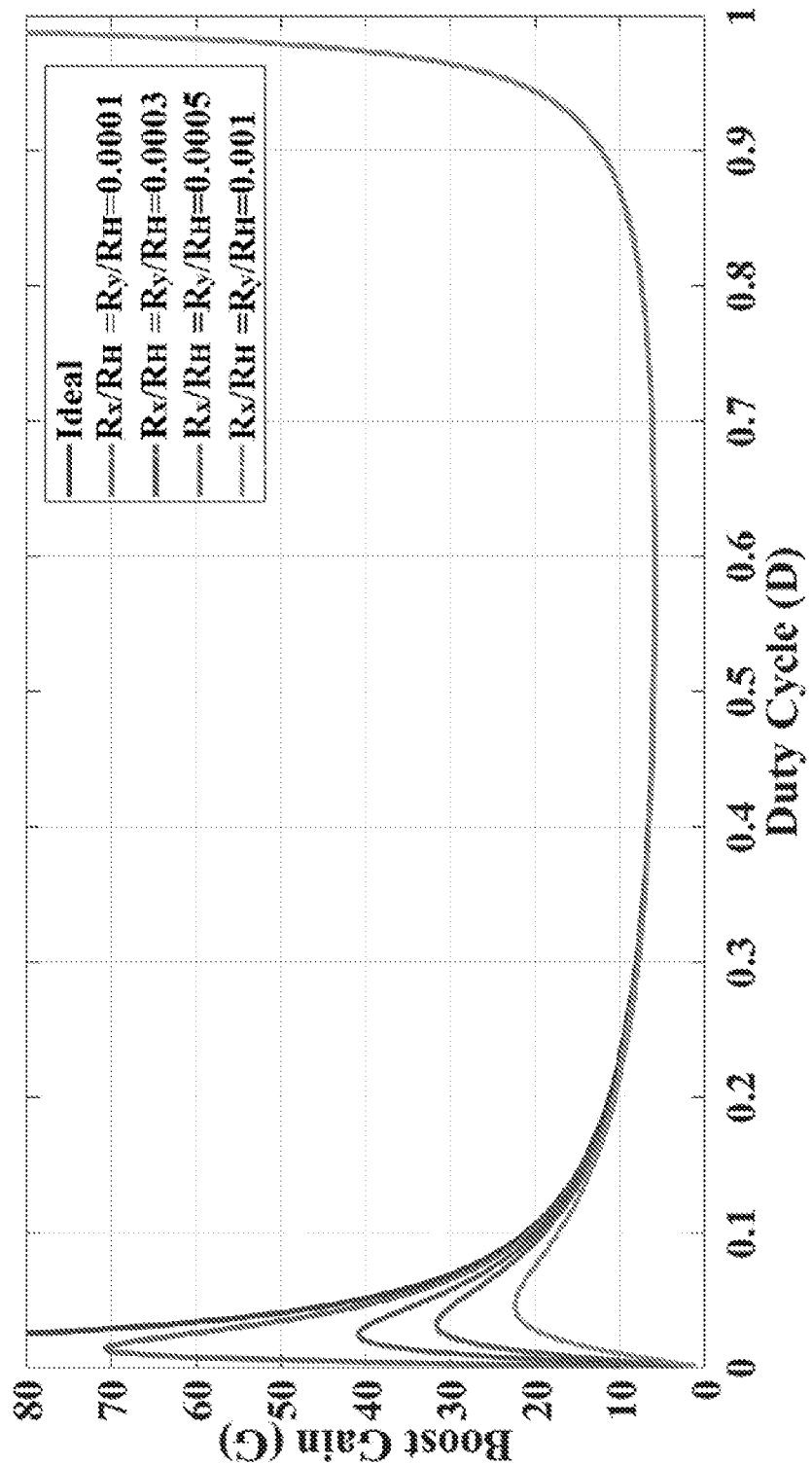
FIG. 18 shows the actual or non-ideal gain of the DC-DC converter of FIG. 2 in configuration PWM2 in boost mode.

The influence of parasitic components on the converter gain in boost mode is very small in the interval D=0.1 to 0.9, as shown in FIG. 17 with reference to PMW 1. However, the boost gain will reduce high values of D in the range 0.9 to 1, which is not the normal operating point of the converter. Similar performance can be seen for PWM2 as shown in FIG. 18.

B. Buck Mode:

The performance of voltage buck with duty cycle is also investigated in similar manner. The non-ideal voltage transfer ration is given for PWM1 as (87).

$$G_{Practical} = \frac{V_L}{V_H} = \frac{D(1-D)}{1+D} * \frac{1}{1+\frac{(1-D)r_{L2}}{R_L} + \frac{D(1-D)r_c}{R_L}} \quad (87)$$

Let, $$\frac{r_{L2}}{R_L} = \frac{R_x}{R_L} \text{ and } \frac{r_{c2}}{R_L} = \frac{R_y}{R_L}$$

The above can be written as, $$G_{Practical} = \frac{V_L}{V_H} = \frac{D(1-D)}{1+D} * \frac{1}{1+\frac{(1-D)R_x}{R_L} + \frac{D(1-D)R_y}{R_L}} \quad (88)$$

Figure 19:
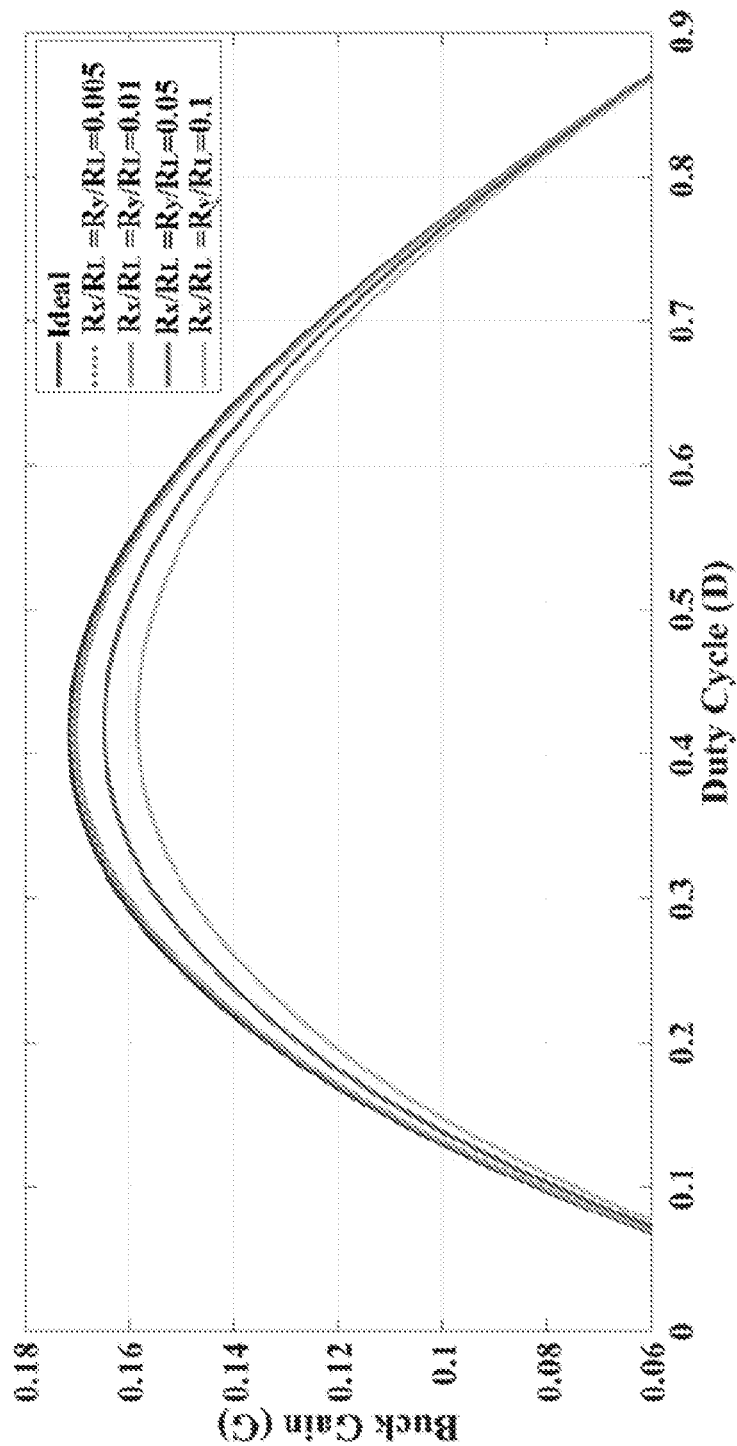
FIG. 19 shows the actual or non-ideal gain of the DC-DC converter of FIG. 2 in configuration PWM1 in buck mode.

The parasitic elements will reduce the buck gain of the duty cycle as shown in FIG. 19. The non-ideal voltage transfer ration is given for PWM2 can be written as (89).

$$G_{Practical} = \frac{V_L}{V_H} = \frac{D(1-D)}{2-D} * \frac{1}{1 + \frac{Dr_{L2}}{R_L} + \frac{D(1-D)r_c}{R_L}} \quad (89)$$

Let $$\frac{r_{L2}}{R_L} = \frac{R_x}{R_L} \text{ and } \frac{r_{c2}}{R_L} = \frac{R_y}{R_L}$$

The above can be written as, $$G_{Practical} = \frac{V_L}{V_H} = \frac{D(1-D)}{2-D} * \frac{1}{1 + \frac{DR_x}{R_L} + \frac{D(1-D)R_y}{R_L}} \quad (90)$$

Figure 20:
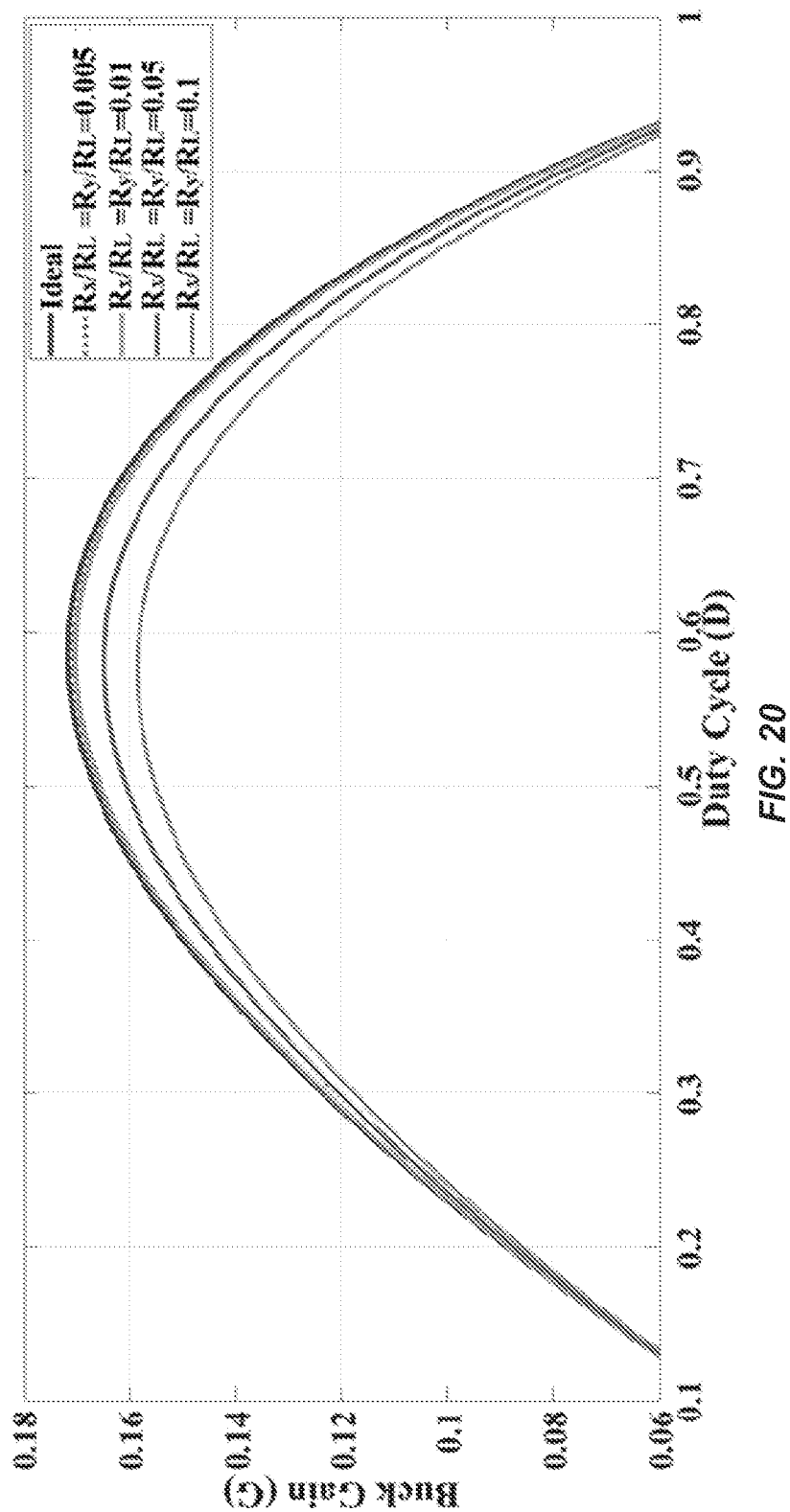
FIG. 20 shows the actual or non-ideal gain of the DC-DC converter of FIG. 2 in configuration PWM2 in buck mode.

Similar performance can be seen for PWM2 as shown in FIG. 20.

Thus, the non-ideal performances show that the passive components parasitic are not dominating much as compared to the conventional converters. In buck mode, the desired voltage gain can be achieved in practical system and is very close to the ideal gain.

Figure 21:
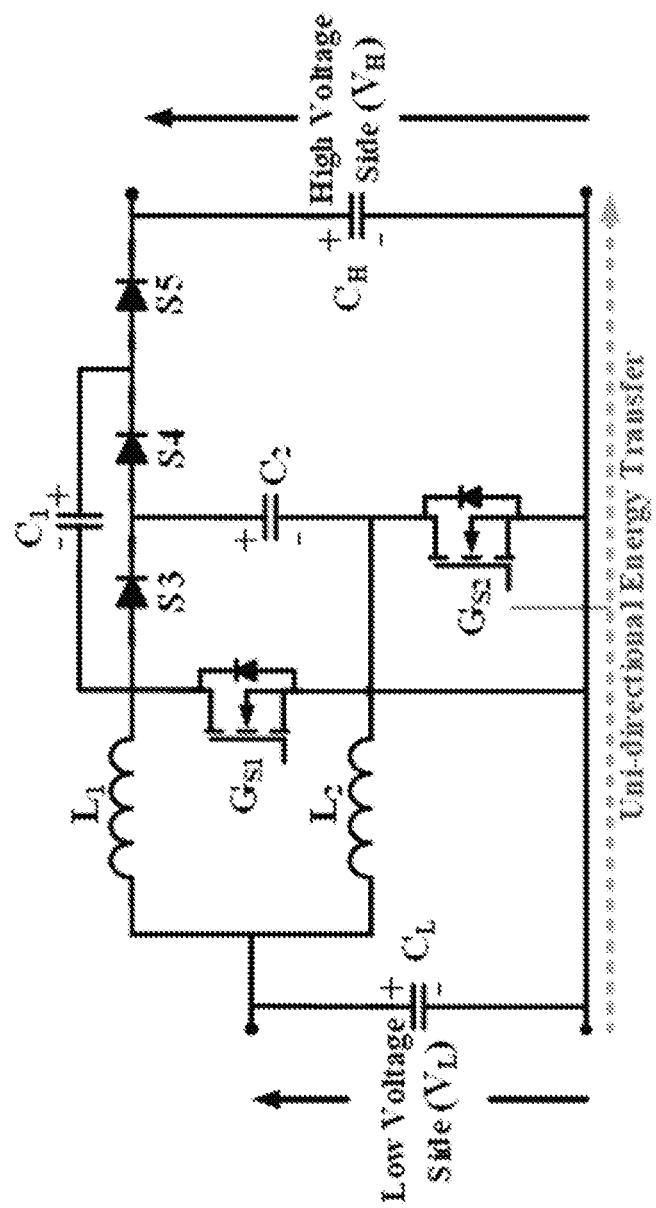
FIG. 21 diagrammatically shows an example of a unidirectional high gain DC to DC boost converter, in accordance with various embodiments.
Figure 22:
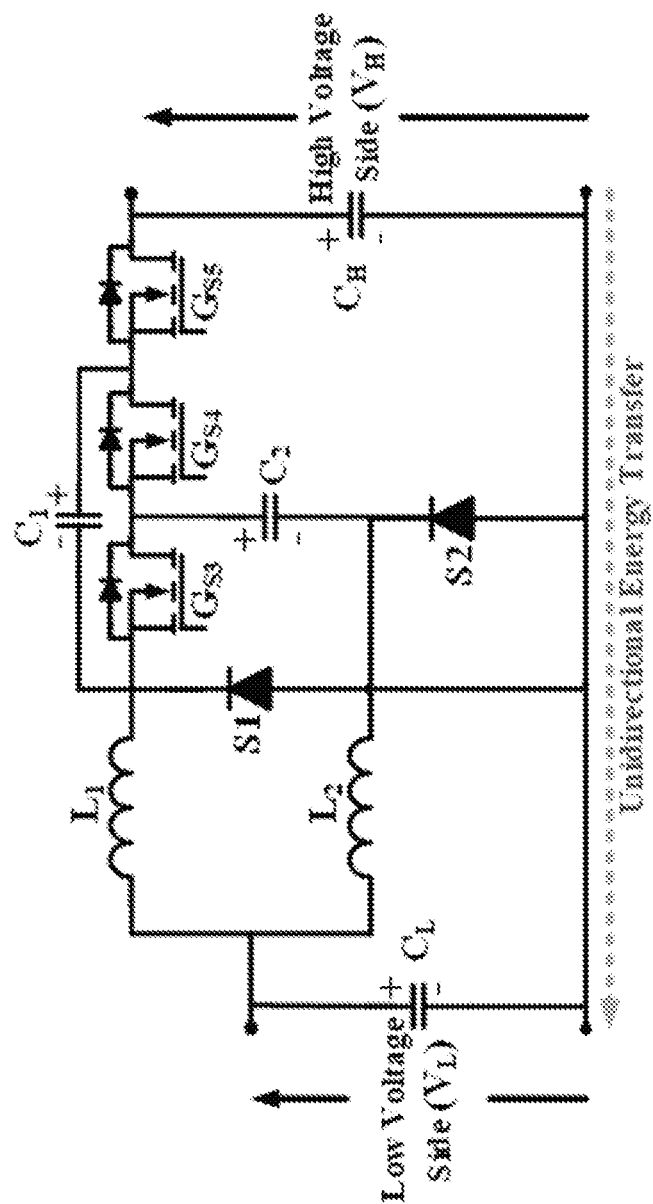
FIG. 22 diagrammatically shows an example of a unidirectional high gain DC to DC buck converter, in accordance with various embodiments.

Variations on the converter designs described above can be used as unidirectional high gain DC to DC boost converters or buck converters, as shown in FIGS. 21 and 22.

FIG. 21 diagrammatically shows an example of a unidirectional high gain DC to DC boost converter, in accordance with various embodiments. The unidirectional high gain DC to DC boost converter can be derived from the above converter shown in FIG. 2 by replacing switches S3, S4 and S5 with diodes. The design details, analysis, and the dynamic model of the converter given above for boost mode operation are valid for such the unidirectional high gain DC to DC converter.

FIG. 22 diagrammatically shows an example of a unidirectional high gain DC to DC buck converter, in accordance with various embodiments. The unidirectional DC to DC buck converter can be derived from the above converter shown in FIG. 2 by replacing switches S1 and S2 with diodes. The design details, analysis, the dynamic model of the converter and the results given above for Buck mode operation are valid for the unidirectional DC to DC Buck converter.

Advantages of the DC-DC converter 12 over many existing DC-DC converters includes:

(i) In boost mode that is energy transfer form low voltage source to high voltage-side load, a voltage gain of 5.8 and higher is achieved. This is much higher than many existing DC-DC converters.

(ii) The DC-DC converter 12 can transfer energy from high voltage-side load to low voltage-side source during regeneration and the proposed converter operates in buck mode, and can give a voltage step down or Buck ratio of 1/5.8, which is a high reduction ratio compared to many existing DC-DC converters.

(iii) The DC-DC converter 12 has fewer switches and passive elements compared to existing high gain DC-DC converters.

(iv) The DC-DC converter 12 does not apply abnormal or extremely high voltages or currents across the switches, as verified analytically and through simulation.

(v) The current drawn from the power source is continuous and exhibits less ripple than many existing DC-DC converters, which is a relevant improvement for battery-powered systems. Many existing DC-DC converters either draw discontinuous power or cause a high ripple current from the source.

(vi) The DC-DC converter 12 can use a common ground between input and output. For controllability, stability and reliability, common ground is preferable for a bi-directional converter.

(vii) The total current drawn from a low voltage source is split between two inductors, resulting in a low current rating across the inductors in the DC-DC converter 12 as compared to many existing high gain converters.

(viii) The high voltage side is configured as a switched capacitor arrangement which brings the ESR of capacitors in parallel, thus reducing the negative effects of parasitic elements.

Through analytical methods it is shown that the inductors and capacitors have no significant influence on gain in boost mode, and the small signal model of the DC-DC converter 12 is presented and verified through simulation.

Various computational methods discussed above may be performed in conjunction with or using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary, 3rd Edition or a dictionary known to those of skill in the art, such as the Oxford Dictionary of Biochemistry and Molecular Biology (Ed. Anthony Smith, Oxford University Press, Oxford, 2004).

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

All references, including patent filings (including patents, patent applications, and patent publications), scientific journals, books, treatises, technical references, and other publications and materials discussed in this application, are incorporated herein by reference in their entirety for all purposes.

Aspects of the disclosure can be modified, if necessary, to employ the systems, functions, and concepts of the above references and application to provide yet further embodiments of the disclosure. These and other changes can be made to the disclosure in light of the detailed description.

Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

While the above provides a full and complete disclosure of exemplary embodiments of the present invention, various modifications, alternate constructions and equivalents may be employed as desired. Consequently, although the embodiments have been described in some detail, by way of example and for clarity of understanding, a variety of modifications, changes, and adaptations will be obvious to those of skill in the art. Accordingly, the above description and illustrations should not be construed as limiting the invention, which can be defined by the appended claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A bi-directional direct current (DC) voltage converter, comprising:
   a low-voltage side ground node and a low-voltage side positive node for coupling with a low-voltage direct current (DC) power assembly;
   a high-voltage side ground node and a high-voltage side positive node for coupling with a high-voltage DC electrical assembly;
   a first inductor connected between the low-voltage side positive node and a first circuit node;
   a first switch with a first antiparallel diode across the first switch connected between the first circuit node and ground;
   a second inductor connected between the low-voltage side positive node and a second circuit node;
   a second switch with a second antiparallel diode across the second switch connected between the second circuit node and ground;
   a third switch with a third antiparallel diode across the third switch connected between the first circuit node and a third circuit node;
   a fourth switch with a fourth antiparallel diode across the fourth switch connected between the third circuit node and a fourth circuit node;

a first capacitor connected between the first circuit node and the fourth circuit node;
a second capacitor connected between the third circuit node and the second circuit node;
a fifth switch with a fifth antiparallel diode across the fifth switch connected between the fourth circuit node and the high-voltage side positive node; and
a control unit operatively coupled with each of the first switch, the second switch, the third switch, the fourth switch, and the fifth switch, wherein the control unit is configured to:
operate in a boost mode in which the control unit controls each of the first switch, the second switch, the third switch, the fourth switch, and the fifth switch to convert a first low-voltage DC power supplied by the low-voltage DC power assembly to a first high-voltage DC power supplied to the high-voltage DC electrical assembly; wherein the first high-voltage DC power has a first high-voltage potential relative to ground, wherein the first low-voltage DC power has a first low-voltage potential relative to ground, and wherein the first high-voltage potential is higher than the first low-voltage potential; and
operate in a buck mode in which the control unit controls each of the first switch, the second switch, the third switch, the fourth switch, and the fifth switch to convert a second high-voltage DC power supplied by the high-voltage DC electrical assembly to a second low-voltage DC power supplied to the low-voltage DC power assembly; wherein the second high-voltage DC power has a second high-voltage potential relative to ground, wherein the second low-voltage DC power has a second low-voltage potential relative to ground, and wherein the second high-voltage potential is higher than the second low-voltage potential.

2. The bi-directional DC voltage converter of claim 1, wherein the first high-voltage potential is at least 5 times the first low-voltage potential.

3. The bi-directional DC voltage converter of claim 1, wherein the control unit, when operated in the boost mode, is configured to keep each of the third switch, the fourth switch, and the fifth switch open while controlling switching of each of the first switch and the second switch to alternate between a first configuration in which the first switch is closed and the second switch is open and a second configuration in which the first switch is open and the second switch is closed.

4. The bi-directional DC voltage converter of claim 3, wherein the control unit, when operated in the buck mode, is configured to keep each of the first switch and the second switch open while controlling switching of each of the third switch, the fourth switch, and the fifth switch to alternate between a third configuration in which the fourth switch is closed and each of the third switch and the fifth switch is open and a fourth configuration in which the fourth switch is open and each of the third switch and the fifth switch is closed.

5. The bi-directional DC voltage converter of claim 1, wherein the control unit, when operated in the buck mode, is configured to keep each of the first switch and the second switch open while controlling switching of each of the third switch, the fourth switch, and the fifth switch to alternate between a third configuration in which the fourth switch is closed and each of the third switch and the fifth switch is open and a fourth configuration in which the fourth switch is open and each of the third switch and the fifth switch is closed.

6. The bi-directional DC voltage converter of claim 1, wherein the low-voltage DC power assembly comprises a rechargeable battery.

7. The bi-directional DC voltage converter of claim 1, wherein the high-voltage DC electrical assembly comprises an electrical motor drive.

8. An electric vehicle comprising the bi-directional DC voltage converter of claim 1.

9. The bi-directional DC voltage converter of claim 1, wherein each of the low-voltage side ground node and the high-voltage side ground node is connected to ground.

10. The bi-directional DC voltage converter of claim 1, wherein the second high-voltage potential is at least 5 times the second low-voltage potential.

11. The bi-directional DC voltage converter of claim 1, further comprising a first diode, a second diode, a third diode, a fourth diode, and a fifth diode, wherein:
the first diode is connected between the first circuit node and ground and blocks flow of current through the first diode from the first circuit node to ground;
the second diode is connected between the second circuit node and ground and blocks flow of current through the second diode from the second circuit node to ground;
the third diode is connected between the first circuit node and the third circuit node and blocks flow of current through the third diode from the third circuit node to the first circuit node;
the fourth diode is connected between the third circuit node and the fourth circuit node and blocks flow of current through the fourth diode from the third circuit node to the first circuit node; and
the fifth diode is connected between the fourth circuit node and the high-voltage side positive node and blocks flow of current through the fifth diode from the high-voltage side positive node to the fourth circuit node.

12. The bi-directional DC voltage converter of claim 1, further comprising a high-voltage side capacitor connected between the high-voltage side positive node and the high-voltage side ground node.

13. The bi-directional DC voltage converter of claim 1, further comprising a low-voltage side capacitor connected between the low-voltage side positive node and the low-voltage side ground node.

14. A step-up direct current (DC) voltage converter, comprising:
a low-voltage side ground node and a low-voltage side positive node for coupling with a low-voltage direct current (DC) power assembly, wherein the low-voltage side ground node is connected to ground;
a high-voltage side ground node and a high-voltage side positive node for coupling with a high-voltage DC electrical assembly, wherein the high-voltage side ground node is connected to ground;
a first inductor connected between the low-voltage side positive node and a first circuit node;
a first switch connected between the first circuit node and ground;
a first diode connected between the first circuit node and ground, wherein the first diode blocks flow of current through the first diode from the first circuit node to ground;
a second inductor connected between the low-voltage side positive node and a second circuit node;

a second switch connected between the second circuit node and ground;
a second diode connected between the second circuit node and ground, wherein the second diode blocks flow of current through the second diode from the second circuit node to ground;
a third diode connected between the first circuit node and a third circuit node, wherein the third diode blocks flow of current through the third diode from the third circuit node to the first circuit node;
a fourth diode connected between the third circuit node and a fourth circuit node, wherein the fourth diode blocks flow of current through the fourth diode from the third circuit node to the first circuit node;
a first capacitor connected between the first circuit node and the fourth circuit node;
a second capacitor connected between the third circuit node and the second circuit node;
a fifth diode connected between the fourth circuit node and the high-voltage side positive node, wherein the fifth diode and blocks flow of current through the fifth diode from the high-voltage side positive node to the fourth circuit node; and
a control unit configured to control each of the first switch and the second switch to convert a low-voltage DC power to a high-voltage DC power, wherein the high-voltage DC power has a high-voltage potential relative to ground, wherein the low-voltage DC power has a low-voltage potential relative to ground, and wherein the high-voltage potential is higher than the low-voltage potential.

15. The step-up DC voltage converter of claim 14, wherein the high-voltage potential is at least 5 times the low-voltage potential.

16. The step-up DC voltage converter of claim 14, wherein the control unit is control switching of each of the first switch and the second switch to alternate between a first configuration in which the first switch is closed and the second switch is open and a second configuration in which the first switch is open and the second switch is closed.

17. An electric vehicle comprising the step-up DC voltage converter of claim 14.

18. A step-down direct current (DC) voltage converter, comprising:
a low-voltage side ground node and a low-voltage side positive node for coupling with a low-voltage direct current (DC) power assembly, wherein the low-voltage side ground node is connected to ground;
a high-voltage side ground node and a high-voltage side positive node for coupling with a high-voltage DC electrical assembly, wherein the high-voltage side ground node is connected to ground;
a first inductor connected between the low-voltage side positive node and a first circuit node;
a first diode connected between the first circuit node and ground, wherein the first diode blocks flow of current through the first diode from the first circuit node to ground;
a second inductor connected between the low-voltage side positive node and a second circuit node;
a second diode connected between the second circuit node and ground, wherein the second diode blocks flow of current through the second diode from the second circuit node to ground;
a first switch connected between the first circuit node and a third circuit node;
a third diode connected between the first circuit node and a third circuit node, wherein the third diode blocks flow of current through the third diode from the third circuit node to the first circuit node;
a second switch connected between the third circuit node and a fourth circuit node;
a fourth diode connected between the third circuit node and a fourth circuit node, wherein the fourth diode blocks flow of current through the fourth diode from the third circuit node to the first circuit node;
a first capacitor connected between the first circuit node and the fourth circuit node;
a second capacitor connected between the third circuit node and the second circuit node;
a third switch connected between the fourth circuit node and the high-voltage side positive node;
a fifth diode connected between the fourth circuit node and the high-voltage side positive node, wherein the fifth diode and blocks flow of current through the fifth diode from the high-voltage side positive node to the fourth circuit node; and
a control unit configured to control each of the first switch, the second switch, and the third switch to convert a high-voltage DC power to a low-voltage DC power, wherein the high-voltage DC power has a high-voltage potential relative to ground, wherein the low-voltage DC power has a low-voltage potential relative to ground, and wherein the high-voltage potential is higher than the low-voltage potential.

19. The step-down DC voltage converter of claim 18, wherein the high-voltage potential is at least 5 times the low-voltage potential.

20. The step-down DC voltage converter of claim 18, wherein the control unit controls switching of each of the first switch, the second switch, and the third switch to alternate between a first configuration in which the second switch is closed and each of the first switch and the third switch is open and a second configuration in which the second switch is open and each of the first switch and the third switch is closed.

* * * * *